(12) United States Patent
Saito et al.

(10) Patent No.: US 11,524,427 B2
(45) Date of Patent: Dec. 13, 2022

(54) WATER SOLUBLE BARRIER COATINGS FOR WASHOUT TOOLING FOR A COMPOSITE LAYUP

(71) Applicant: UT-Battelle, LLC, Oak Ridge, TN (US)

(72) Inventors: Tomonori Saito, Oak Ridge, TN (US); Lu Han, Oak Ridge, TN (US); Amelia M. Elliott, Oak Ridge, TN (US); Dustin B. Gilmer, Oak Ridge, TN (US)

(73) Assignees: UT-BATTELLE, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 119 days.

(21) Appl. No.: 17/126,457

(22) Filed: Dec. 18, 2020

(65) Prior Publication Data

US 2022/0193959 A1 Jun. 23, 2022

(51) Int. Cl.
*B29C 33/62* (2006.01)
*B29C 70/30* (2006.01)
*B29C 33/38* (2006.01)
*C09D 7/61* (2018.01)
*C09D 125/18* (2006.01)
(Continued)

(52) U.S. Cl.
CPC .......... *B29C 33/62* (2013.01); *B29C 33/3842* (2013.01); *B29C 70/30* (2013.01); *B29C 70/54* (2013.01); *C09D 5/002* (2013.01); *C09D 5/008* (2013.01); *C09D 7/61* (2018.01); *C09D 7/70* (2018.01); *C09D 125/18* (2013.01);
(Continued)

(58) Field of Classification Search
CPC ..... B29C 33/56; B29C 33/62; B29C 33/3842; B29C 70/30; B28B 7/342; C09D 7/61; C09D 7/70; C09D 5/002; C09D 5/008; C09D 125/18; C09D 133/02; C09D 141/00; C09D 179/02
See application file for complete search history.

(56) References Cited

U.S. PATENT DOCUMENTS

2018/0222082 A1* 8/2018 Günther .................. B29C 33/56
2020/0216363 A1 7/2020 Saito et al.
(Continued)

OTHER PUBLICATIONS

Computer-generated English-language translation of KR 2020-0120590 A to Kwon et al. (Year: 2020).*
(Continued)

*Primary Examiner* — Vu A Nguyen
(74) *Attorney, Agent, or Firm* — Warner Norcross + Judd LLP

(57) ABSTRACT

A washout tooling for a composite layup is provided. The washout tooling comprises a casting mold having an exterior surface. The casting mold comprises a particulate material and a water-soluble binder. The casting mold is adapted to break down in the presence of an aqueous solution. The washout tooling further comprises a water-soluble coating layer overlying the exterior surface. The water-soluble coating layer is adapted to break down in the presence of an aqueous solution. The washout tooling further comprises a curable composite layer overlying the water-soluble coating layer. The water-soluble coating layer minimizes contact between the particulate material and the curable composite layer.

19 Claims, 15 Drawing Sheets

(51) Int. Cl.
  *C09D 133/02*  (2006.01)
  *C09D 141/00*  (2006.01)
  *C09D 179/02*  (2006.01)
  *C09D 5/00*    (2006.01)
  *C09D 7/40*    (2018.01)
  *B29C 70/54*   (2006.01)

(52) U.S. Cl.
  CPC ......... *C09D 133/02* (2013.01); *C09D 141/00* (2013.01); *C09D 179/02* (2013.01)

(56) References Cited

U.S. PATENT DOCUMENTS

2020/0306821 A1   10/2020   Takama et al.
2020/0338629 A1   10/2020   Herzog

OTHER PUBLICATIONS

Sigma-Aldrich's Thermal Transitions of Homopolymers.*
Computer-generated English-language translation of WO 2017014178 A1.*
Gilmer, D. et al., "Additive manufacturing of strong silica sand structures enabled by polyethyleneimine binder" Nature Communications, vol. 12, No. 5144, Aug. 26, 2021.
International Search Report and Written Opinion in corresponding International patent application No. PCT/US20121/060488 dated Mar. 15, 2022.

* cited by examiner

WATER SOLUBLE BARRIER COATINGS FOR WASHOUT TOOLING FOR A COMPOSITE LAYUP

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE DISCLOSURE

The present invention relates generally to sacrificial tooling, and method for making the same.

BACKGROUND OF THE DISCLOSURE

Tooling is the process of designing and engineering the tools that are necessary to manufacture parts or components. The metal machining for mold represents an excellent example of tooling. Such tools include those for vacuum, stretch, and thermal forming as well as autoclaved composite layups. These tools are often utilized to form components of transportation industry, which requires ducting products, including engine intake and exhaust, as well as cabin air conditioning systems. Most ducting is made of solid plastic or metal components, but there is opportunity to remove weight from ducting by using components with carbon fiber composites and removing the weight of tooling to create hollow structures. Unfortunately, due to the complex shapes required of this tooling, traditional methods for composite layup that use a permanent manifold cannot be used. Conventional methods have been developed for creating one-time use tooling necessary for complex manifolds that can be "washed out" by rinsing the tool with water. Specifically, by using binder jetting of ceramic powders including sands, highly structural tooling can be created at much higher volumes than other additive manufacturing processes.

Tools for composite forming can be made from essentially any material such as fiberglass reinforced plastic, high-density foams, machinable epoxy boards, or clay. However, these materials can only apply to produce parts in low quantities, parts cured at ambient or low temperature, or for prototype parts which does not require concise dimensional accuracy. To create more dimensionally accurate parts in high-quantities at high temperature, high-performance steel-and-nickel alloys, such as Invar are typically utilized, but they are also more costly. Ceramics are particularly well-suited for each of these tooling applications because of their very low coefficient of thermal expansion (CTE). When combined with a right binder, infiltrants, and coatings, the ceramic parts can have properties that exceed concrete. These attributes combined with the low cost of many ceramic powders and the low cost of the binder jetting process make the manufacturing of large, strong tooling a real possibility at a fraction of current tooling prices.

The introduction of the latest manufacturing process, i.e. 3D printing, has the ability to greatly increase the throughput of tooling production. Furthermore, the capability to fabricate complex part geometries using layer-by-layer deposition as opposed to traditional manufacturing now enables production of tools that would be otherwise impossible to create without 3D printing. For example, binder jetting is an additive manufacturing process in which a printhead strategically drops a liquid binding agent to selectively join powder particles within a layer. The job box lowers, and another layer of powder is then spread, and more binder is spread. Over time, the part develops through the layering of powder and binder. Binder jetting is well-suited for the tooling industry due to high production rates, high resolution, and the ability to process low-cost feedstocks. The binder jet machines can print sand artifacts on the order of several feet in size.

The washout tooling process of 3D printing hollow objects is faster and more affordable than traditional methods of manufacturing multi-piece metal breakdown tooling. In addition, because the sand cores can be printed in more complex designs, washout tooling formed using binder jetting also eliminates the need for the multi-piece molds used to make castable washout tooling media for a faster and more streamlined process. Water soluble binder for washout tooling eliminates the expenses and lead time associated with traditional manufacturing of composite parts with trapped geometries. Washout tooling by binder jetting leverages soluble support material for 3D printing hollow objects.

With printed sand tools, a hermetic barrier between the sand and the epoxy in the composite layup must be created to prevent any sand particles from being bonded to the final geometry. The currently used process requires manually covering the printed tools with a tape, which is effective but labor intensive and difficult to scale. In addition, a typical hydrophobic coating including taping on the sand tooling surface greatly decreases the washout property.

Teflon wrapping on the printed tool is the most widely used technique. The wrapping shows good properties including high temperature resistance, non-sticky surface. However, Teflon is not water soluble which decrease the washout property and application of Teflon is a labor intensive and time-consuming process. Silicone is another widely used material to prevent any sand particles from being bonded to the final geometry. Silicone coatings show high elongation and tear strength. However, silicone coatings is not water soluble which decrease the washout property. Urethane is another widely used material. The urethane coating shows good property including electrostatic discharge safe. However, urethane coating is not water soluble.

SUMMARY OF THE DISCLOSURE

In one embodiment, a washout tooling for a composite layup is provided. The washout tooling comprises a casting mold having an exterior surface. The casting mold comprises a particulate material and a water-soluble binder. The casting mold is adapted to break down in the presence of an aqueous solution. The washout tooling further comprises a water-soluble coating layer overlying the exterior surface. The water-soluble coating layer is adapted to break down in the presence of an aqueous solution. The washout tooling further comprises a curable composite layer overlying the water-soluble coating layer. The water-soluble coating layer minimizes contact between the particulate material and the curable composite layer.

In another embodiment, a method for forming the composite layup is provided. The method comprises combining a particulate material and a water-soluble binder to form a casting mold having an exterior surface. The method further comprises applying a water-soluble coating material to overly the exterior surface to form a water-soluble coating layer. The method further comprises applying a curable composite material to overly the water-soluble coating layer to form a curable composite layer. The method further comprises exposing the casting mold and the water-soluble coating layer to an aqueous solution to form the composite layup.

In an exemplary embodiment, the water-soluble binder is deposited through inkjet nozzles to the particulate material to form a casting mold. The water-soluble binder that is ink jetted provides the initial strength/shape of the preform through chemical bonding with the particulate material, and the strength of that bond depends on the characteristics of each feedstock. An infiltrating polymer may be applied to the casting mold to infiltrated therethrough. The infiltrating polymer may provide mechanical strength and also the bonding surface for coatings, and its effectiveness depends highly on the chemistry between the particulate material, the water-soluble binder, and the water-soluble coating material. The water-soluble coating material is applied to the casting mold form a barrier between the particulate material and the curable composite layer. The water-soluble coating material serves as a functional barrier. In washout tooling, this is final coating between the sand print and the adhesive used in the carbon fiber layup functions such that no sand attaches to the final composite structure.

In certain embodiments, the water-soluble coating material comprises water soluble polymers or swellable polymers in water, so that the coating can be effectively removed after forming the composite layup. The water-soluble coating material may include a high glass transition temperature, such that the polymer will not flow during the curing process for the curable composite layer. The water-soluble coating material may include an inorganic filler for adjusting the rheology property of the water-soluble coating material and tuning surface finish.

A new polymer coating method was successfully developed for wash-out tooling that prevents sand from remaining in the carbon fiber layup after curing. A consecutive dip-coating method was developed for sand tooling utilizing polyethylenimine (PEI) binder, which significantly improves the barrier between the carbon fiber surface and the sand tool. Non-limiting examples of suitable PEI binders are disclosed in U.S. Pat. Pub. No. US 2020/0216363, the entire disclosure of which, except for disclaimers, disavowals, and inconsistencies, is hereby incorporated by reference herein. The PEI binder may be more suitable for use in the consecutive coating method relative to other binders having high water solubility. A spray coating method with a water-soluble coating layer formed from a poly(vinylsulfonic acid, sodium salt) (PVS-Na) 30% water solution may be used with printed sand tools to improve geometric accuracy while minimizing loose sand on the surface of the carbon fiber layup.

These and other features and advantages of the present invention will become apparent from the following description of the invention, when viewed in accordance with the appended claims.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION

Figure 1:
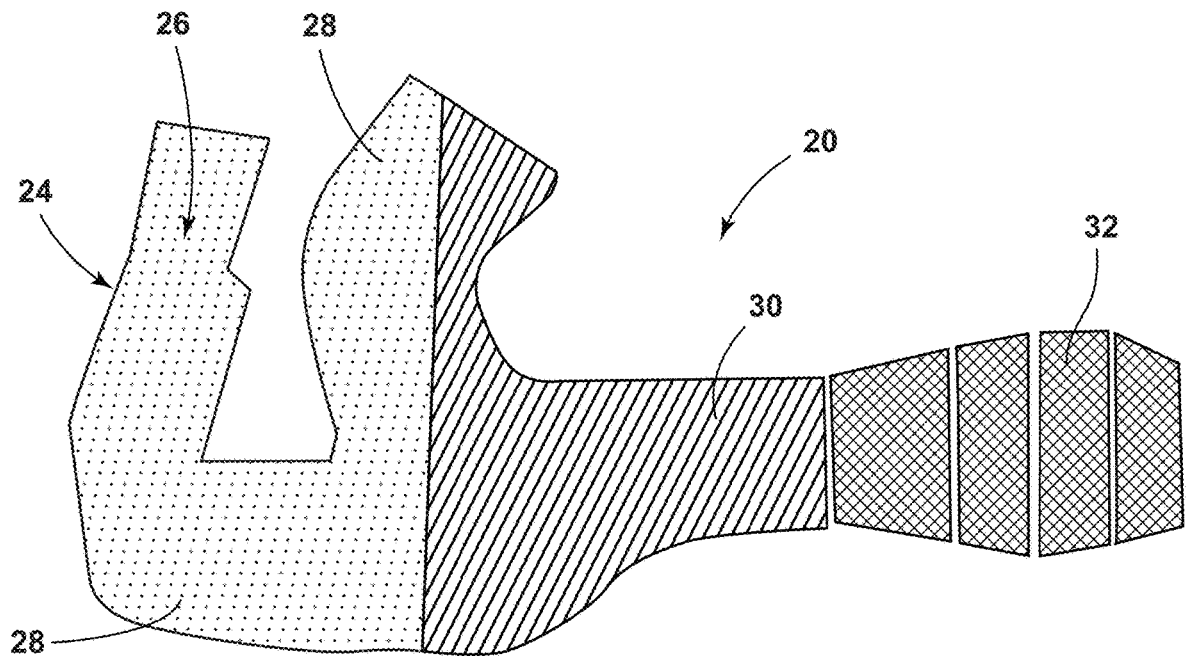
FIG. 1 illustrates a schematic view of a non-limiting embodiment of a washout tooling for a composite layup.

FIG. 1 illustrates a schematic view of a non-limiting embodiment of a washout tooling 20 for a composite layup 22. The washout tooling 20 comprises a casting mold 24 having an exterior surface 26. The casting mold 24 comprises a particulate material 28. The washout tooling 20 further comprises a water-soluble coating layer 30 overlying the exterior surface 26. The washout tooling 20 further comprises a curable composite layer 32 overlying the water-soluble coating layer 30. The composite layup 22 may be used to form a molded part. The water-soluble coating layer 30 minimizes contact between the particulate material 28 and the curable composite layer 32. In certain embodiments, the water-soluble coating layer 30 minimizes migration of the particulate material 28 to the curable composite layer 32 when curing. Further, in these and other embodiments, the curable composite layer 32 has an interior surface adjacent the water-soluble coating layer 30 and the water-soluble coating layer 30 improves geometric accuracy of the interior surface due to minimization of migration of the particulate material 28 to the curable composite layer 32 when curing. Moreover, in these and other embodiments, the water-soluble coating layer 30 improves the flexural strength of the casting mold 24.

The casting mold 24 may be formed utilizing any additive manufacturing process and performed by any suitable apparatus, understood in the art of additive manufacturing (AM) and/or three-dimensional (3D) printing. ASTM Designation F2792-12a, which is titled "Standard Terminology for Additive Manufacturing Technologies" and herein incorporated by reference in its entirety, defines additive manufacturing as "a process of joining materials to make objects from 3D model data, usually layer upon layer, as opposed to subtractive manufacturing methodologies," and 3D printing as "the fabrication of objects through the deposition of a material using a print head, nozzle, or another printer technology."

Examples of additive manufacturing include binder jet additive manufacturing, extrusion additive manufacturing, liquid additive manufacturing, fused filament fabrications, fused deposition modeling, direct ink deposition, material jet, polyjet printers, ink-jetting printers, material jetting printers, syringe extrusion printers, and combinations thereof. In certain embodiments, binder jet additive manufacturing is utilized to form the casting mold 24.

The casting mold 24 may have at least one negative impression of the outer shape of the molded part to be produced. The casting mold 24 produced utilizing additive manufacturing may also include a core (not shown) which forms an inner shape or a cavity within the molded part to be produced. In other words, the casting mold 24 may have complex geometric shapes, such as undercuts.

The casting mold 24 comprises the particulate material 28 and a water-soluble binder. The particulate material 28 may be any material known in the art for additive manufacturing, e.g., sand (e.g., cerabeads), gypsum, thermoplastics as well as metal, mineral, silicate or ceramic powders. The term "particulate material" used within the scope of this application includes both granular materials and fiber materials, such as cellulose fibers, wood fibers, grass fibers, etc. The particulate material may be organic or inorganic. In various embodiments, the particulate material 28 may comprises a sand, a gypsum, a metal, a ceramic powder, or a combination thereof. In certain embodiments, the particulate material 28 comprises the ceramic powder.

The water-soluble binder may be any binder known in the art for additive manufacturing, e.g., a polysaccharide, a protein, a salt, a silicate, a tannin, polyvinyl acetate, polyvinyl alcohol, polyvinylpyrrolidone. The term "water-soluble" as utilized herein with reference to the binder means that the binder completely dissolves or disperses in water at a temperature of 23° C. in an amount of at least 1, alternatively at least 5, or alternatively at least 10 gram(s) per liter of water in accordance with OECD 105. In certain embodiments, the water-soluble binder comprises a PEI, poly(vinyl pyrrolidone), poly(vinyl alcohol), poly(acrylic acid), poly(vinylsulfonic acid, sodium salt), copolymers thereof, or combinations thereof. It is to be appreciated that the copolymers of the water-soluble binder comprise at least one of the monomers of the polymers. For example, the water-soluble binder may comprise copolymers formed from one or more monomers comprising ethylenimine, vinyl pyrrolidone, vinyl alcohol, acrylic acid, or vinylsulfonic acid. In certain embodiments, the water-soluble binder comprises polymers or copolymers formed from one or more monomers comprising ethylenimine, vinyl pyrrolidone, vinyl alcohol, acrylic acid, or vinylsulfonic acid. The casting mold 24 may comprise the water-soluble binder in an amount from about 0.01 to about 50 wt. % or alternatively from about 0.2 to about 10 wt. % based on a total weight of the casting mold 24.

In various embodiments, the water-soluble binder is applied in layers utilizing an applicator, such as an extruder nozzle, which is movable in space. In certain embodiments, a powder bed-based layering method may be used, in which the particulate material 28 is applied in thin layers onto a platform, and a computer-controlled print head selectively prints areas with the water-soluble binder on the basis of a digital data record for the purpose of bonding these areas. The excess particulate material 28 which was not bonded may subsequently be removed from the bonded material and, e.g., reused.

The casting mold 24 is adapted to break down in the presence of an aqueous solution. The phrase "break down"

as utilized herein with reference to the casting mold means that the casting mold is divided into two or more parts, and in embodiments, to the extent that the casting mold is substantially flowable. As used herein, the term "substantially" as utilized herein with reference to the casting mold being flowable means that at least 10 wt. %, alternatively at least 50 wt. %, or alternatively at least 90 wt. % of the casting mold, based on total weight of the casting mold, is flowable.

The aqueous solution may be any solution known in the art suitable for breaking down water-soluble binders. In various embodiments, the aqueous solution comprises water, an alcohol, a ketone, an acetate, a cyclic ether, or combinations thereof. Break down of the casting mold 24 may be in the presence of the aqueous solution at a temperature of from about 23° C. to about 100° C. and at a pressure of from at least 40 pounds per square inch (psi).

Referring now to the water-soluble coating layer 30 introduced above, the water-soluble coating layer 30 may be any layered material known in the art suitable for coating the casting mold 24. The term "water-soluble" as utilized herein with reference to the coating layer means that the coating completely dissolves or disperses in water at a temperature of 23° C. in an amount of at least 1, alternatively at least 5, or alternatively at least 10 gram(s) per liter of water in accordance with OECD 105. In various embodiments, the water-soluble coating layer 30 has a water solubility of from about 1 gram to about 100 grams, alternatively from about 5 grams to about 90 grams, or alternatively from about 10 grams to about 70 grams per 100 grams of water at 23° C. according to OECD 105.

The water-soluble coating layer 30 is adapted to break down in the presence of an aqueous solution. The phrase "break down" as utilized herein with reference to the water-soluble coating layer means that the water-soluble coating layer is divided into two or more parts, and in embodiments, to the extent that the water-soluble coating layer is substantially flowable. As used herein, the term "substantially" as utilized herein with reference to the water-soluble coating layer being flowable means that at least 10 wt. %, alternatively at least 50 wt. %, or alternatively at least 90 wt. % of the water-soluble coating layer, based on total weight of the water-soluble coating layer, is flowable.

The aqueous solution may be any solution known in the art suitable for breaking down water-soluble binders. In various embodiments, the aqueous solution comprises water, an alcohol, a ketone, an acetate, a cyclic ether, or combinations thereof. Break down of the casting mold 24 may be in the presence of the aqueous solution at a temperature of from about 23° C. to about 100° C. and at a pressure of from at least 40 pounds per square inch (psi).

In various embodiments, the water-soluble coating layer 30 comprises a water-soluble coating material having a glass transition temperature of from about 50° C. to about 400° C. or alternatively from about 80° C. to about 350° C., according to ASTM D7028-07(2015). In various embodiments, the glass transition temperature is greater than the curing temperature of the curable composite layer 32, which will be described in greater detail below, to minimize flow of the water-soluble coating material during curing of the curable composite layer 32.

As introduced above, the water-soluble coating layer 30 may improve the flexural strength of the casting mold 24 including the water-soluble coating layer 30 as compared to a casting mold free of the water-soluble coating layer 30. In certain embodiments, the casting mold 24 including the water-soluble coating layer 30 has a flexural strength of at least 1.3 MPa, alternatively at least 1.5 MPa, alternatively at least 2 MPa, alternatively at least 2.5 MPa, or alternatively at least 3 MPa. The improved flexural strength of the casting mold 24 provides an improved durability to the casting mold 24, which improves application of the curable composite layer 32 leading to an improved composite layup 22.

The water-soluble coating material may be applied to the exterior surface 26 of the casting mold 24 using any application method known in the art. In certain embodiments, the water-soluble coating material is applied to the exterior surface 26 by a submersion coating method. In other embodiments, the water-soluble coating material is applied to the exterior surface 26 by a spray coating method. In various embodiments, the water-soluble coating material is different from the water-soluble binder.

The water-soluble coating material may comprise a water-soluble polymer. The water-soluble polymer may be any polymer known in the art suitable for forming the water-soluble coating layer 30. In certain embodiments, the water-soluble polymer comprises poly(vinyl alcohol), poly(acrylic acid), poly(acrylic acid, sodium salt), poly(sodium 4-styrenesulfonate), poly(vinylsulfonic acid, sodium salt), or combinations thereof. The water-soluble polymers may be represented by the structures of Formulas (I)-(V):

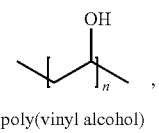

poly(vinyl alcohol)

(I)

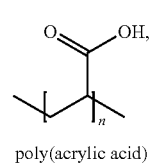

poly(acrylic acid)

(II)

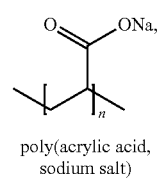

poly(acrylic acid, sodium salt)

(III)

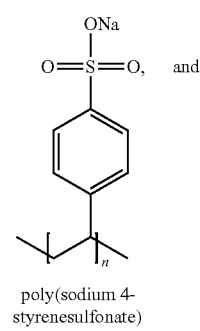

poly(sodium 4-styrenesulfonate)

(IV)

and

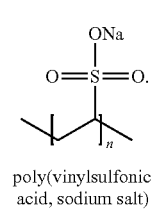

poly(vinylsulfonic acid, sodium salt)

(V)

Non-limiting examples of suitable poly(vinyl alcohol) polymers have a weight average molecular weight ($M_w$) of from 85,000 g/mol to 124,000 g/mol, are hydrolyzed in an amount of from 87 to 89 wt. %, have a $T_g$ of 80° C., and are commercially available from Sigma-Aldrich. Non-limiting examples of suitable poly(acrylic acid) polymers have an average $M_v$ of 450,000 g/mol or of 1,000,000 g/mol, have a $T_g$ of at least 100° C., and are commercially available from Sigma-Aldrich. Non-limiting examples of suitable poly (acrylic acid, sodium salt) polymers have an average $M_v$ of 450,000 g/mol, have a $T_g$ of at least 230° C., and are commercially available from Sigma-Aldrich. Non-limiting examples of suitable poly(sodium 4-styrenesulfonate) polymers have an average $M_w$ of 1,000,000 g/mol and are commercially available from Sigma-Aldrich. Non-limiting examples of suitable poly(vinylsulfonic acid, sodium salt) polymers have an average $M_w$ of from 4,000 to 6,000 g/mol, are in an aqueous solution (30% w/w), and are commercially available from Sigma-Aldrich.

In embodiments wherein the water-soluble coating material is applied by a submersion coating method, the water-soluble polymer may comprise the poly(acrylic acid). The poly(acrylic acid) may have a viscosity average molecular weight ($M_v$) of from about 10,000 to about 2,000,000 g/mol, alternatively from about 200,000 to about 700,000 g/mol, or alternatively from about 400,000 to about 500,000 g/mol. The water-soluble coating material to be applied by sub-mersion coating may comprise the water-soluble polymer in an amount of from about 0.01 to about 80 wt. % or alternatively from about 0.05 to about 50 wt. % based on a total weight of the water-soluble coating material.

In embodiments wherein the water-soluble coating material is applied by a spray coating method, the water-soluble polymer may comprise a poly(vinylsulfonic acid, sodium salt). The poly(acrylic acid) may have a viscosity average molecular weight ($M_v$) of from about 100 to about 2,000,000 g/mol, alternatively from about 1,000 to about 1,250,000 g/mol, or alternatively from about 4,000 to about 6,000 g/mol. The water-soluble coating material to be applied by spray coating may comprise the water-soluble polymer in an amount of from about 0.01 to about 80 wt. % based on a total weight of the water-soluble coating material.

The water-soluble coating material may further comprise a neutralizing component. The neutralizing component may be any material known in the art suitable for forming the water-soluble coating layer 30. The neutralizing component may have a pH of at least 8 or alternatively from about 8 to about 14. In certain embodiments, the neutralizing component comprises sodium hydroxide, potassium hydroxide or similar base, and poly(vinyl pyrrolidone) and their various copolymers, any cationic polymers, or combinations thereof. The water-soluble coating material may comprise the neutralizing component in an amount of from about 0.01 to about 80 wt. % based on a total weight of the water-soluble coating material.

The water-soluble coating material may further comprise a solvent. The solvent may be any material known in the art suitable for forming the water-soluble coating layer 30. The solvent may be aqueous, organic non-aqueous, or inorganic non-aqueous. The solvent may be polar or non-polar. The solvent may be hydrophobic or hydrophilic. The solvent may be aromatic or aliphatic. It is to be appreciated that the solvent may include any combination of solvents described above. In various embodiments, the solvent is a hydrophilic solvent, such as an alcohol.

In certain embodiments, the solvent comprises methanol, 1-propanol, ethanol, isopropanol, water, or combinations thereof. The water-soluble coating material may comprise the solvent in an amount of from about 20 to about 99.9 wt. % based on a total weight of the water-soluble coating material.

The water-soluble coating material may further comprise a filler. The filler may be any material known in the art suitable for forming the water-soluble coating layer 30. The filler may have an average particle size of less than 10 μm, alternatively less than 1 μm, or alternatively less than 100 nm. The filler may include particles having a round or irregular configuration (e.g., needle-shaped particles). In certain embodiments, the filler comprises a nanofiller, clays, silica, salts, talc, or combinations thereof. The water-soluble coating material may comprise the filler in an amount of from about 0.01 to about 20 wt. % based on a total weight of the water-soluble coating material.

In various embodiments, the water-soluble coating layer 30 may comprise a first water-soluble coating layer and a second water-soluble coating layer overlying the first water-soluble coating layer. The first water-soluble coating layer may be formed from the water-soluble coating material. The second water-soluble coating layer may also be formed from the water-soluble coating material. In other embodiments, the water-soluble coating layer 30 may comprise a third water-soluble coating layer overlying the second water-soluble coating layer. The third water-soluble coating layer may also be formed from the water-soluble coating material. The water-soluble coating material for the first, second, and third water-soluble coating layers may be the same or different.

In one exemplary embodiment, the water-soluble coating material of the first water soluble coating layer comprises PVS-Na and the water-soluble coating material of the second water-soluble coating layer comprises PVP. In another exemplary embodiment, the water-soluble coating material of the first water soluble coating layer comprises PAA and the water-soluble coating material of the second water-soluble coating layer comprises PVS-Na. In yet another exemplary embodiment, the water-soluble coating material of the first water soluble coating layer comprises PAA, the water-soluble coating material of the second water-soluble coating layer comprises PVS-Na, and the water-soluble coating material of the third water-soluble coating layer comprises PVP.

Referring now to the curable composite layer 32 introduced above, the curable composite layer 32 may be any material known in the art suitable for overlying the water-soluble coating layer 30. The term "curable" as utilized herein with reference to the composite layer means that the composite layer is capable of being cured to form a substantially thermoset composite layer.

In various embodiments, the curable composite layer 32 comprises a curable composite material. The term "curable" as utilized herein with reference to the curable composite material means that the curable composite material is capable of being cured to form a substantially thermoset curable composite material. The curable composite material may comprise fibers such as carbon fibers, glass fibers, silicon carbide fibers, basalt fibers, or combinations thereof. In various embodiments, the curable composite material is a fiber reinforced composite. The curable composite material may comprise a polymeric material to form a polymer matrix with the fibers disposed throughout the polymer matrix.

Figure 2:
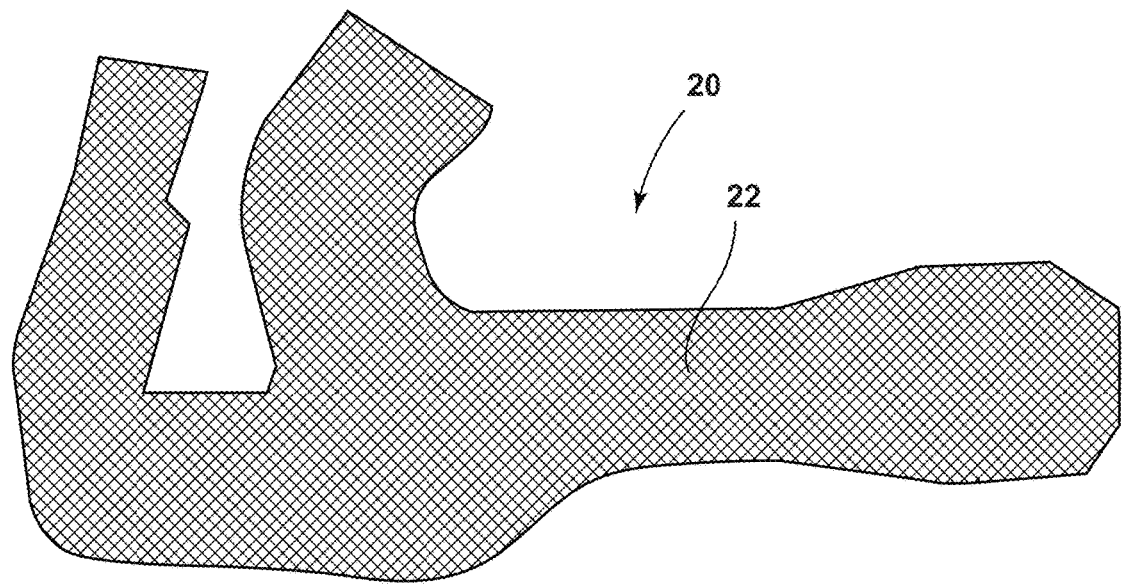
FIG. 2 illustrates a schematic view of a non-limiting embodiment of the composite layup of FIG. 1.

FIG. 2 illustrates a schematic view of a non-limiting embodiment of the composite layup 22 of FIG. 1. Non-limiting examples of molded parts suitable to be formed utilizing the composite layup 22 include ducting, lightweight geometries, sandwich structures, and hollow structures.

Figure 3:
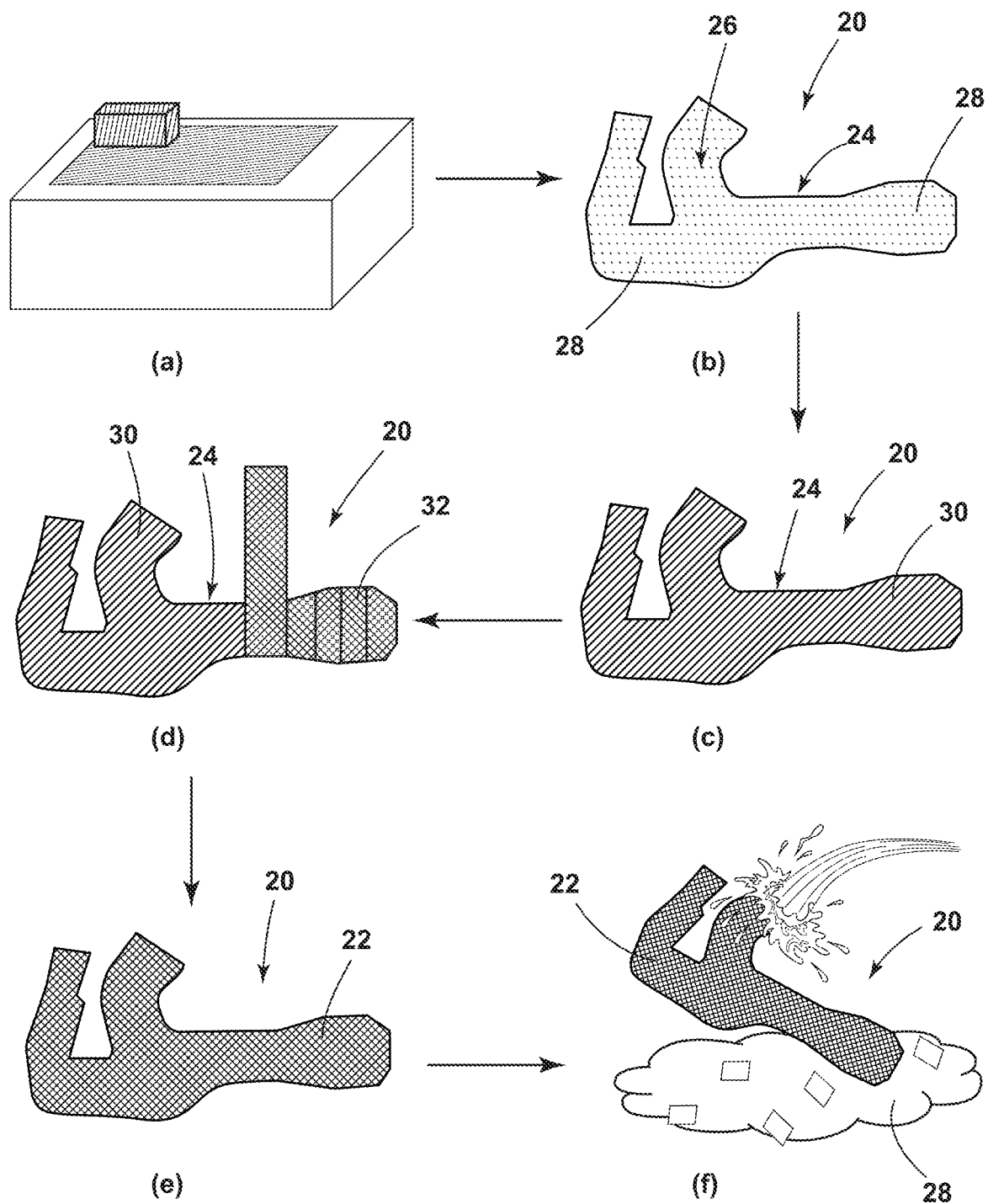
FIG. 3 illustrates a schematic view of a non-limiting embodiment of steps for forming the composite layup of FIG. 1.

FIG. 3 illustrates a schematic view of a non-limiting embodiment of steps for forming the molded part. A method for forming the molded part is provided herein. The method comprises combining the particulate material 28 and the water-soluble binder to form the casting mold 24 having the exterior surface 26. As described above, the casting mold 24 may be formed utilizing any additive manufacturing process and performed by any suitable apparatus, understood in the art of additive manufacturing (AM) and/or three-dimensional (3D) printing. With specific reference to (a) of FIG. 3, binder jet additive manufacturing may be utilized to combine the particulate material 28 and the water-soluble binder form the casting mold 24 as generally illustrated in (b) of FIG. 3. In certain embodiments, the step of combining the particulate material 28 and the water-soluble binder comprises jetting the water-soluble binder on the particulate material 28 to form the casting mold 24 utilizing binder jet additive manufacturing.

The method further comprises applying the water-soluble coating material to overly the exterior surface 26 to form the water-soluble coating layer 30. As introduced above, the water-soluble coating material may be applied to the exterior surface 26 of the casting mold 24 using any application method known in the art. In various embodiments, at least 10%, alternatively at least 50%, alternatively at least 75%, alternatively at least 90% of the exterior surface 26 receives the water-soluble coating material. With specific reference to (b) of FIG. 3, the water-soluble coating material may be applied to the exterior surface 26 of the casting mold 24 as generally illustrated in (c) of FIG. 3.

In certain embodiments, the water-soluble coating material is applied to the exterior surface 26 by a submersion coating method (commonly referred to in the art as dip-coating). In these embodiments, the step of applying the water-soluble coating material may comprise submerging the casting mold 24 in the water-soluble coating material. The components of the water-soluble coating material described above may be combined to form a single composition, or isolated from each other into separate vessels. When isolated into separate vessels, the casting mold 24 may be submerged into a first vessel comprising at least the water-soluble polymer and then submerged into a second vessel comprising at least the neutralizing component. In these embodiments, the water-soluble coating material may comprises poly(acrylic acid).

Figure 4:
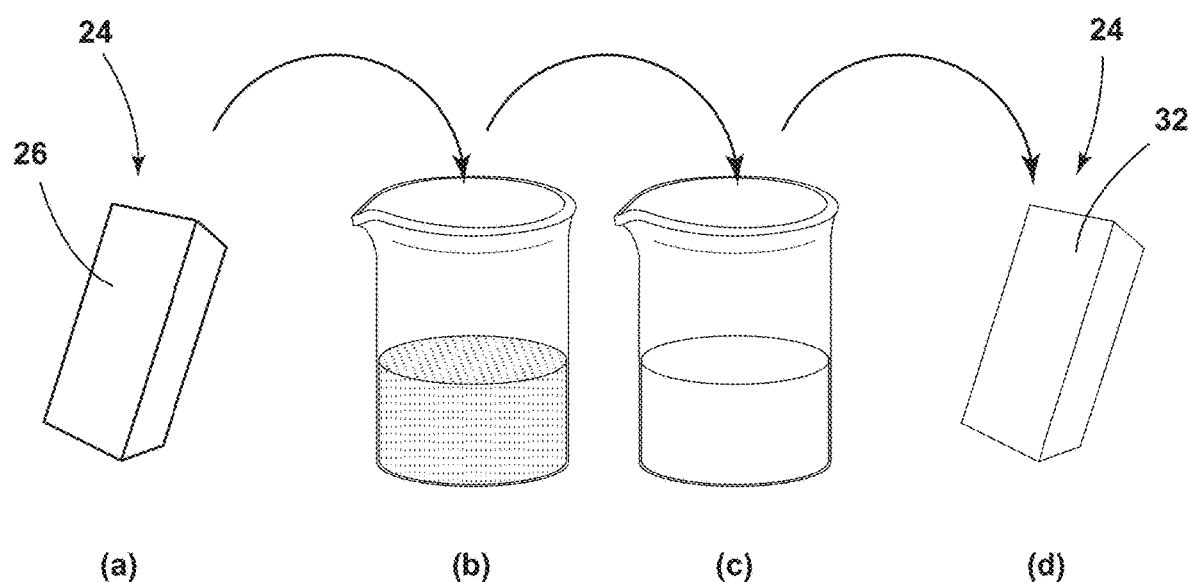
FIG. 4 illustrates a schematic view of a non-limiting embodiment of a submersion method for applying a water-soluble coating material to a casting mold.

FIG. 4 illustrates a schematic view of a non-limiting embodiment of a submersion method for applying the water-soluble coating material to the casting mold 24. The submersion method may be a consecutive dip-coating method including at least first submersion and a second submersion. Dip coating involves immersing a substrate in a precursor solution and then lifting it up vertically. The material is deposited on the substrate during the immersion and then the solvent is removed by evaporation, resulting in unique thickness of the coating layer. Despite its simple appearance, the dip-coating process involves a complex interplay between many contracting factors: viscous drag upward on the liquid by the moving substrate, force of gravity on the wet film, surface tension in the concavely shaped meniscus, surface tension gradient along the height of the film due to drying effects, the disjoining (or conjoining) pressure (important for films less than 1-µm thick) and others. In the setting of industry application, the process is simplified by controlling less parameters which include polymer solution concentration, take-up ratio, and dip time in polymer solution.

As shown in FIG. 4, the casting mold 24 may be submerged in at least the water-soluble polymer for a period of time (e.g., at least 1 second, at least 5 seconds, or at least 10 seconds) and then removed from the water-soluble polymer at a constant speed (e.g., 0.1 mm/s to 10 mm/s, 0.5 mm/s to 5 mm/s, or 0.5 mm/s to 2 mm/s). The casting mold 24 may then be submerged in at least the neutralizing component (e.g., sodium hydroxide solution (0.9 M in methanol)) for a period of time (e.g., at least 1 second, at least 5 seconds, or at least 10 seconds) and then removed from the neutralizing component at a constant speed (e.g., 0.1 mm/s to 10 mm/s, 0.5 mm/s to 5 mm/s, or 0.5 mm/s to 2 mm/s).

PAA is typically hygroscopic, brittle and colorless in nature with $T_g$ in the range of 102-109° C. At temperatures above 200 to 250° C., PAA may lose water and become an insoluble crosslinked polymer anhydride. Compared with high molecular weight PAA (h-PAA), low molecular weight PAA (l-PAA) may exhibit improved solubility in water and alcohols with negligible loss in thermostability. PAA-S is the sodium carboxylate form of l-PAA after salt exchange with Na+ in the NaOH methanol secondary dip-coating described above. With the exchange of carboxyl acid group to sodium carboxylate salt, the salt can be stable up to about 400° C. The secondary dip and exchange to the sodium carboxylate salt may not only significantly improve its thermostability, but may also decrease the occurrence of dehydration, which may ensure the washout property of the sand tooling without crosslinking. The solubility of the dried PAA/PAA-S polymer coatings in water may also increases with rise in temperatures.

In some embodiments, the step of submerging the casting mold 24 in the water-soluble coating material comprises submerging the casting mold 24 in the water-soluble coating material, removing the casting mold 24 from the water-soluble coating material, and then submerging the casting mold 24 in the water-soluble coating material. It is to be appreciated that the components of the water-soluble coating material described above may be combined to form a single composition, or isolated from each other into separate vessels.

In other embodiments, the water-soluble coating material is applied to the exterior surface 26 by a spray coating method. In these embodiments, the step of applying the water-soluble coating material comprises spraying the casting mold 24 with the water-soluble coating material. The components of the water-soluble coating material described above may be combined to form a single composition to be applied at once, or isolated from each other to be applied separately. When isolated from each other to be applied separately, at least the water-soluble polymer may be sprayed onto the casting mold 24 and then at least the neutralizing component may be sprayed onto the casting mold 24. In these embodiments, the water-soluble coating material may comprises poly(vinylsulfonic acid, sodium salt).

The method further comprises applying the curable composite material to overly the water-soluble coating layer 30 to form the curable composite layer 32. The curable composite material may be applied using any application method known in the art including, but not limited to, dip coating, spray coating, deposition, wrapping, and the like. In certain embodiments, the curable composite material is in the form of a strip and is wrapped about the exterior surface 26 of the casting mold 24 overlying the water-soluble coating layer 30. With specific reference to (c) of FIG. 3, the curable composite material may be applied to the exterior surface 26 of the casting mold 24 overlying the water-soluble coating layer 30 as generally illustrated in (d) of FIG. 3.

The method may further comprise exposing the curable composite layer 32 to an energy source. In certain embodiments, the energy source may be a thermal energy source or an irradiation energy source (e.g. UV light or e-beam). The curable composite layer 32 may be exposed to the energy source for a time period of from about 0.01 seconds to about 180 minutes depending on the energy source. As one non-limiting example, for a thermal energy source, the curable composite layer 32 may be exposed to the energy source for a time period of from about 5 seconds to about 600 minute(s), alternatively from about 10 to about 240 minutes, or alternatively from about 60 to about 180 minutes. As another non-limiting example, for an irradiation energy source, the curable composite layer 32 may be exposed to the energy source for a time period of from about 0.01 seconds to about 60 minute(s), alternatively from about 1 second to about 30 minutes, or alternatively from about 3 seconds to about 10 minutes. The curable composite layer 32 may be exposed to the energy source at a temperature of from about 50° C. to about 500° C., alternatively from about 70° C. to about 350° C., or alternatively from about 80° C. to about 250° C. to cure the curable composite layer 32. It is to be appreciated that the temperature of the exposure should not result in degradation of any component of the washout tool 20. For example, for fiber reinforced composites, temperatures of greater than 250° C. may result in degradation. As described above, in various embodiments, the curing temperature of the curable composite layer 32 is less than the glass transition temperature of the water-soluble coating material to minimize flow of the water-soluble coating material during curing of the curable composite layer 32.

The method further comprises exposing the casting mold 24 and the water-soluble coating layer 30 to the aqueous solution to form the composite layup 22. The casting mold 24 and the water-soluble coating layer 30 may be exposed to the aqueous solution using any method known in the art. In certain embodiments, the casting mold 24 and the water-soluble coating layer 30 are exposed to the aqueous solution having a temperature of from about 23° C. to about 100° C. and at a pressure of from at least 40 pounds per square inch (psi). With specific reference to (e) of FIG. 3, the curable composite layer 32 including the casting mold 24 and the water-soluble coating layer 30 may be exposed to the aqueous solution as generally illustrated in (f) of FIG. 3.

EXAMPLES

Casting molds were formed and evaluated to determine resin migration, dimensional accuracy, and washout properties. Casting molds having the dimensions of 49.9*37.7*37.7 mm were formed from cerabeads and a water-soluble binder having a high water solubility (ExOne's water-soluble binder) into a cuboid shape bar sample printed on an ExOne M-Flex binder jet 3D printer. An airbrush was utilized for spray coating the exemplary water-soluble coating materials on the casting molds. The exemplary water-soluble coating material were each filled in the inlet of airbrush and fine polymer solution/droplets were deposited on the exterior surface of the casting molds.

For these examples, the final criterion is thermal stability, polymers with high glass transition ($T_g$) of the water-soluble coating materials are required for coating due to the curing temperature of many curable composite materials being approximately 150-250° C. Softening, flowing or decomposition of the polymer coating at the curing temperature of the curable composite materials would significantly deteriorate the protection of the water-soluble coating layer, which further influence the dimensional accuracy of the washout tooling. Therefore, water soluble high $T_g$ polymers, PSS-Na and PVS-Na, were evaluated. The curing temperature of the curable composite materials is in the range of 150-250° C. for epoxy curing. In these examples, a high thermal stability with high $T_g$ and $T_m$ minimized softening and melting under high temperature.

Additional casting molds were formed and evaluated to determine resin migration, dimensional accuracy, and washout properties. Casting molds having the dimensions of 57.2 W*38.1 H* 254 L mm were formed from cerabeads and ExOne's water-soluble binder into a trapezoidal shape bar sample printed on an ExOne M-Flex binder jet 3D printer. An airbrush was utilized for spray coating the exemplary water-soluble coating materials on the casting molds. The exemplary water-soluble coating material were each filled in the inlet of airbrush and fine polymer solution/droplets were deposited on the exterior surface of the casting molds. In this iteration water and alcohol soluble polymer Polyvinylpyrrolidone (PVP) was evaluated as a coating polymer in conjunction with PVS-Na to form a barrier coating against resin migration of epoxy when fiber reinforced composites were laid up on the surface of the casting mold and cured at temperature ranging from 150-250° C.

In another iteration water and alcohol soluble polymer PAA was sprayed onto one of the trapezoidal casting molds to create a barrier layer followed by another spray coating of PVS-Na. These coatings when combined form a robust barrier layer to resin migration from the fiber reinforced composites when they are laid up on the surface of the casting molds and cured at high temperatures ranging from 150-250° C.

Materials

Particulate material I is cerabeads and are commercially available.

Water-soluble binder I is an ExOne binder solution that is commercially available from ExOne Corporation.

Water-soluble binder II is polyethylenimine (PEI, branched, average $M_w$ ~800 g/mol by LS, average $M_n$ ~600 g/mol by GPC) that is commercially available from Sigma-Aldrich.

Water-soluble polymer I is a poly(sodium 4-styrenesulfonate) having an average $M_w$ of ~1,000,000 g/mol and is commercially available from Sigma-Aldrich.

Water-soluble polymer II is a poly(vinylsulfonic acid, sodium salt) (PVSA-S, $M_w$ 4,000-6,000 g/mol, solution 30 wt. % in H2O, technical grade) that is commercially available from Sigma-Aldrich.

Water-soluble polymer III is a poly(acrylic acid) (PAA, average $M_v$ ~450,000 g/mol) that is commercially available from Sigma-Aldrich.

Solvent I is water that is commercially available.
Solvent II is methanol that is commercially available.
Solvent III is 1-proponol that is commercially available.
Neutralizing component I is sodium hydroxide that is commercially available.
Filler component I is nanofiller that is commercially available.
Curable composite material I is carbon fiber disposed in an epoxy material to form a carbon fiber prepeg commercially available under the tradename HexPly® M18 from Hexcel.

Equipment

Professional master airbrush multi-purpose airbrush with Model G22 dual-action was used to spray the polymer solution with a ⅓ oz gravity feed fluid cup and 0.3 mm tip. A Model HG-301A Heat gun was used to remove solvent from the coating and harden the coating, and a Heidolph Brinkmann rotary evaporator was utilized for removal of solvent from polymer solutions. A Carver Hydraulic Hot Press Model #3912 was used to apply pressure to the carbon fiber layup to simulate autoclave/vacuum bagging pressures. A Mitutoyo Surftest SJ-210 surface roughness tester was utilized to quantify the surface roughness.

Sample Preparation

Print: Small size casting molds (31.7*12.7*6.35 mm) including particulate material I (cerabeads) were printed with ExOne X1 binder jet 3D printer and the large size casting molds (49.9*37.7*37.7 mm) including particulate material I (cerabeads) were printed on an ExOne M-Flex binder jet 3D printer, each with the water-soluble binder I (ExOne's non-aqueous binder).

Coating: The casting molds were spray coated with water-soluble polymer I (PSS-Na), 2 wt. % in $H_2O$ and water-soluble polymer II (PVS-Na), 30 wt. % in $H_2O$ by airbrush. The samples were dried with a heat gun.

Characterization

1. Polymer Solution Characterization

The viscosity of water-soluble polymer I (PSS-Na) and water-soluble polymer II (PVS-Na) was measured by Electromagnetically Spinning Viscometer (EMS) utilizing an EMS-1000 from Kyoto Electronics Manufacturing Co. The EMS method of measuring viscosity operates by placing the sample in a small test tube with an aluminum sphere inside, which is then placed inside of the instrument. The instrument contains two magnets attached to a rotor, which creates a rotating magnetic field. The rotating magnetic field will then induce eddy currents in the sphere, which will cause the sphere to rotate. The torque applied to the sphere is proportional to the difference in the angular velocity of the magnetic field $\Omega_B$ and one of the spheres $\Omega_S$. This difference in angular velocity creates a linear relationship between $(\Omega_B-\Omega_S)/\Omega_S$ and the viscosity of the liquid being measured.

2. Polymer Coating Thermal Study

Differential Scanning calorimetry (DSC) was used to measure the glass transition temperature of the prepared samples using TA Instruments Q1000 DSC. Approximately 5 to 10 mg of sample was measured into standard sealed aluminum hermetic pans. A heat-cool-heat cycle was run from −90 to 300° C. at a heating rate of 10° C. min$^{-1}$ under nitrogen with a 5-minute isotherm at the maximum temperature and minimum temperature. Using the Universal Analysis software from TA Instruments, the temperature curves were analyzed, and the glass transition temperature was determined.

Thermogravimetric analysis (TGA) was used for measuring the thermal stability by tracking the mass of a sample over time as the temperature increases. About 10 mg of sample was prepared and run from room temperature to 800° C. at a heating rate of 10° C. min$^{-1}$ under nitrogen by TA Instruments Q-50 TGA.

3. Surface Roughness Study

A Mitutoyo SURFTEST SJ-210 profilometer is used to measure a surface's profile, in order to quantify its roughness. A diamond stylus is moved vertically in contact with a sample and then moved laterally across the sample for a specified distance (17.5 mm) and specified contact force (0.75 mN).

4. 3-Point Bending Mechanical Testing

The mechanical property of the green parts was performed using a custom-made three-point bend instrument. The testing utilized MPIF Standard 15 or its equivalent to ASTM B312. This standard is conventionally used in the powder metallurgy industry, analogous to the process of Binder Jetting. The 3-point bend instrument utilized a stepper motor that moved at a rate of 2.54 mm/min. The specimens were printed with the dimensions of 31.7 mm long, 12.7 mm wide, and 6.35 mm tall, following the standard specification. The flexural strength (σ) was determined with equation (Eq. 3).

$$\sigma = \frac{3FL}{2bd^2} \quad (3)$$

F is the force at the fracture point, L is the distance between two supports, b and d are the width and thickness of the tested sample, respectively.

5. Carbon Layup Cleanness Test

The casting molds were covered with curable composite material I (HexPly® M18 carbon fiber prepreg). The curing condition was 2 hours at 180° C. and 700 kN/m² (7 bar) pressure. The hot press maintained the temperature and ensures pressure to remove air pockets from the carbon fiber prepreg and maintained geometric accuracy during curing. The amount of residual sand was observed.

6. Washout Property

After curing, the samples were transferred to water for washout testing. To facilitate this testing, as each sample is exposed to water, a timer was utilized to measure the time of dissolution. Due to how quickly each sample would dissolve this was the only measurement of dissolution preformed. Pressure was not required to perform the dissolution, so this was not measured.

Example 1

Polymer Coating Solution Selection Criteria

Figure 5A:
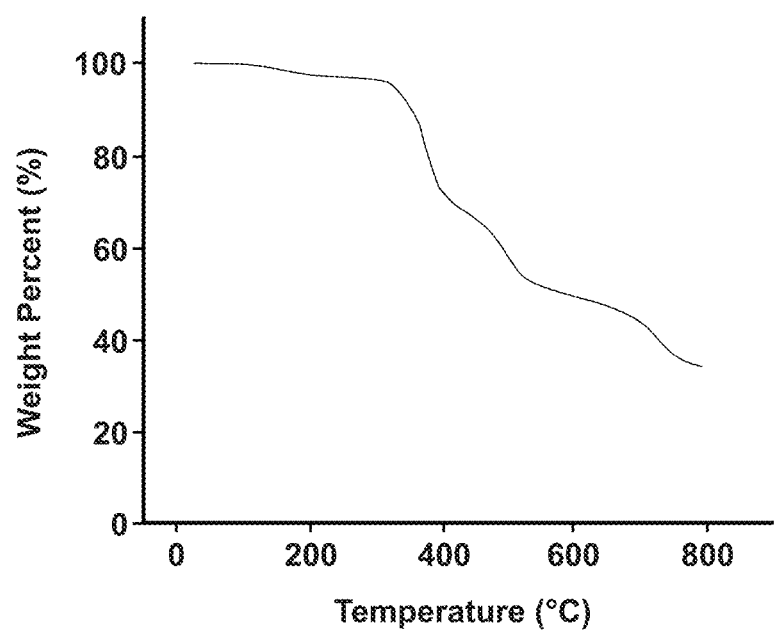
FIG. 5A illustrates a graph showing a non-limiting relationship between temperature and weight percent using thermogravimetric analysis (TGA) for a water-soluble polymer of the washout tooling.
Figure 5B:
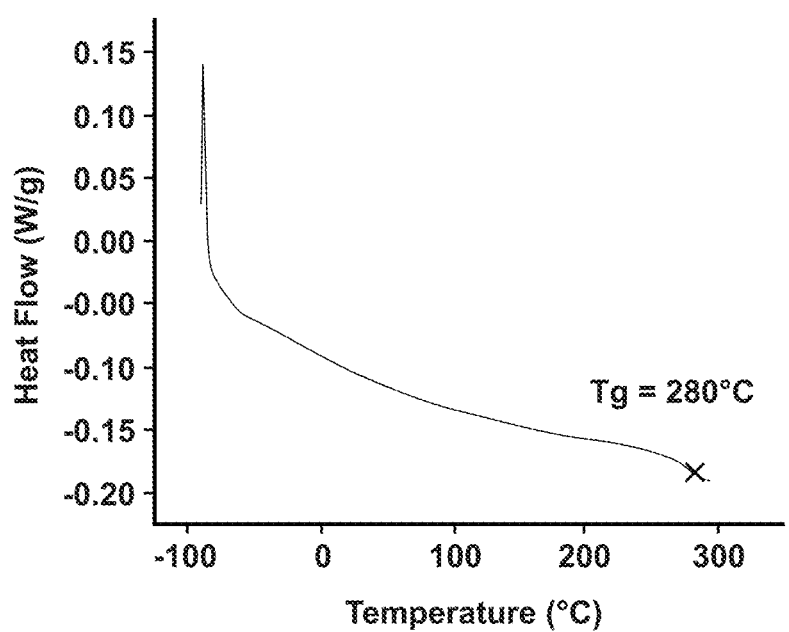
FIG. 5B illustrates a graph showing a non-limiting relationship between temperature and heat flow using differential scanning calorimetry (DSC) for a water-soluble polymer of the washout tooling.

The thermal properties of exemplary water-soluble polymers were tested by eliminating all of the solvent from the water-soluble coating material and then utilizing TGA and DSC for characterization methods. FIG. 5A illustrates a graph showing a non-limiting relationship between temperature and weight percent using thermogravimetric analysis (TGA). FIG. 5B illustrates a graph showing a non-limiting relationship between temperature and heat flow using differential scanning calorimetry (DSC).

Water-soluble polymer II (PVS-Na) began decomposition at 320° C., which is well above curing temperature of many curable composite materials. The measured $T_g$ of water-soluble polymer II (PVS-Na) was 280° C. from the DSC measurement, indicating that no softening, flowing or decomposition of the water-soluble coating layer occurred during curing of the curable composite material. It is believed that the high thermal stability of water-soluble polymer II (PVS-Na) stems from the presence of strong ionic interactions in water-soluble polymer II (PVS-Na).

Example 2

Spray Coating

The molecular weight of the polymer dictates the viscosity of the polymer solution, and thus influences spray coating in the aspects of 1) polymer concentration in solution, and 2) the volume of spray needed to form a sufficiently thick film. The idea here is to make the concentration of polymer solution as high as possible to minimize the water intrusion to the part during the spray coating, so that high geometric accuracy can be achieved, yet maintain a low enough viscosity that the spray nozzle will not clog.

The solution viscosity is highly dependent on molecular weight especially when the molecular weight is higher than critical molecular weight described below. The critical molecular weight $M_c$ shows a great impact on the viscosity of the polymer solution. When the concentration of polymer solution is lower than $M_c$, the zero-shear rate viscosity can be described by a simple power law:

$$\eta = k \cdot M, M < M_c$$

When the concentration of polymer solution is lower than $M_c$, the power-law coefficient a of polymer solution has a value of about 3.4 ±0.2.

$$\eta = k \cdot M^a, M > M_c$$

Figure 6:
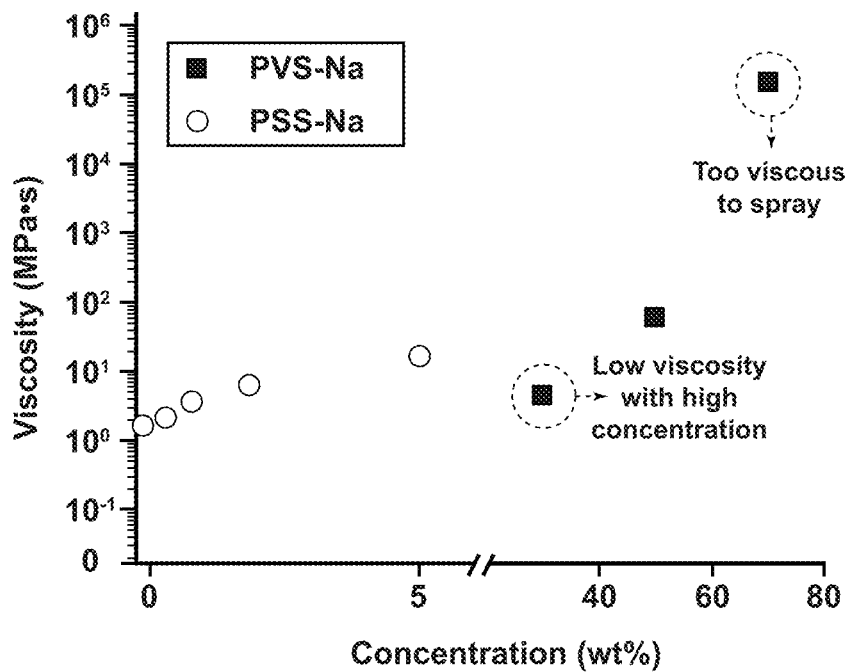
FIG. 6 illustrates a graph showing a non-limiting relationship between concentration of water-soluble polymers and viscosities of the water-soluble coating material.

FIG. 6 illustrates a graph showing a non-limiting relationship between concentration of water-soluble polymers and viscosities of the water-soluble coating material. Two water-soluble polymer polymers were compared for spray coating, water-soluble polymer I (PSS-Na) (·1,000,000 g/mol) and water-soluble polymer II (PVS-Na) (4,000-6,000 g/mol). Five different concentration including 0.1 wt. %, 0.5 wt. %, 1 wt. %, 2 wt. %, 5 wt. % of water-soluble polymer I (PSS-Na) was investigated. Due to the high molecular weight of water-soluble polymer I (PSS-Na), only lower than 2 wt. % concentration could be loaded for spraying before the viscosity became too high. The water-soluble polymer with too high of a viscosity resulted in blocking the spray nozzle and stopping the water-soluble polymer from spraying.

Based on the study, the optimal viscosity range was explored, where the water-soluble polymer is sprayable but as high as possible concentration to minimize the water intrusion to the part to achieve high geometric accuracy. The sprayable viscosity range is 1-10 mPa·s. Water-soluble polymer I (PSS-Na) at 2 wt. % exhibited 6.25 mPa·s. To form a homogeneous film coating on the surface, 8 spray applications were necessary for each surface of the sand tool.

Figure 7A:
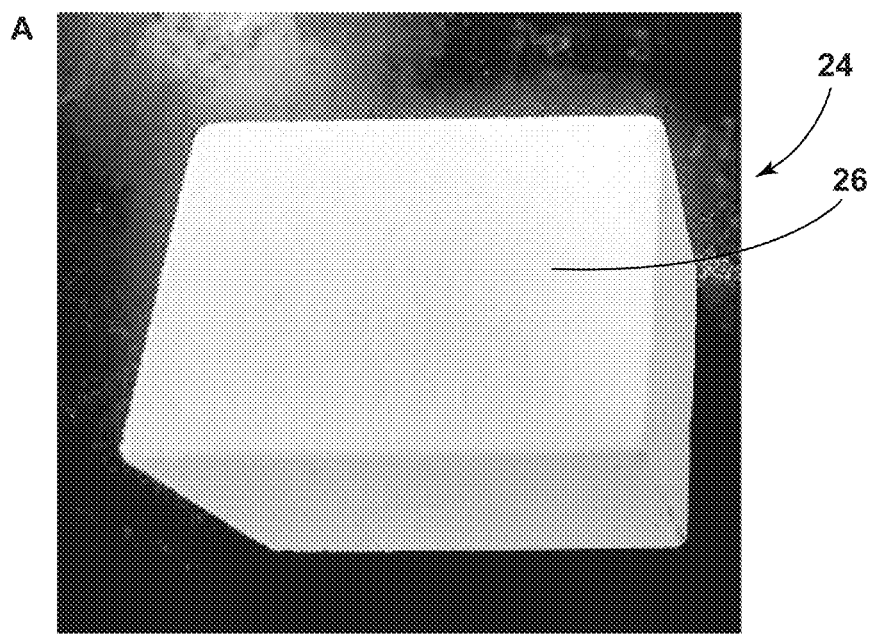
FIG. 7A illustrates a perspective view of a non-limiting embodiment of a casting mold free of the water-soluble coating layer.
Figure 7B:
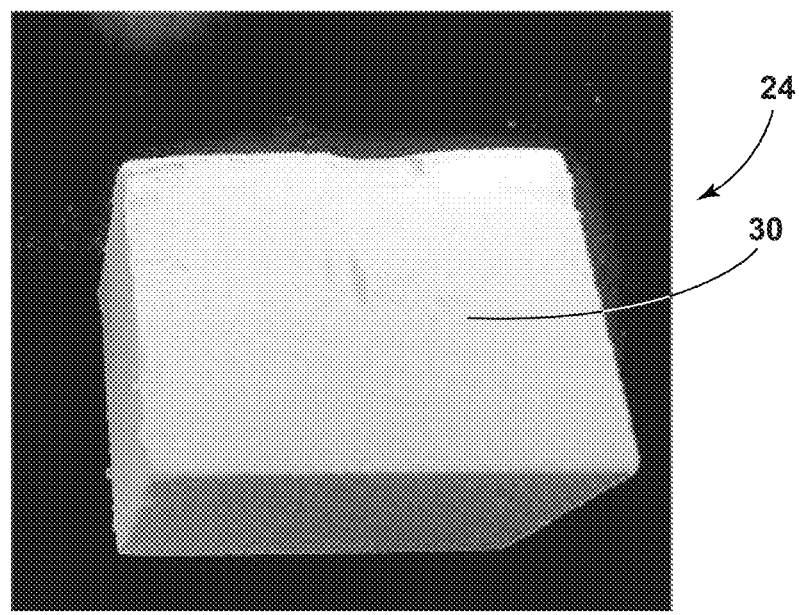
FIG. 7B illustrates a perspective view of a non-limiting embodiment of a casting mold including a water-soluble coating layer.
Figure 7C:
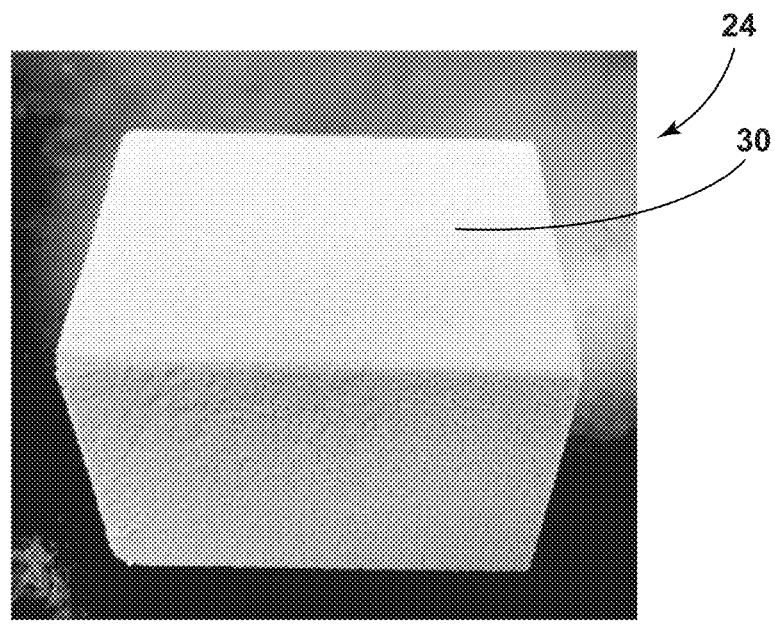
FIG. 7C illustrates a perspective view of a non-limiting embodiment of a casting mold including another water-soluble coating layer.

FIG. 7A illustrates a perspective view of a non-limiting embodiment of the casting mold free of the water-soluble coating layer. FIG. 7B illustrates a perspective view of a non-limiting embodiment of the casting mold including the water-soluble polymer I (PSS-Na) at 2 wt. %. FIG. 7C illustrates a perspective view of a non-limiting embodiment of the casting mold including the water-soluble polymer II (PVS-Na) at 30 wt. %. Dimensional accuracy was shown to suffer due to high volume of solvent exposure by 8 spray coating when utilizing the water-soluble polymer I (PSS-Na), specifically at the edges of the casting mold. To combat this, a higher concentration solution with a low molecular weight polymer decreased the needed number of applications with the spray to as low as 1 spray, so that less water is introduced. The water-soluble polymer II (PVS-Na) at 30 wt. % showed a relatively low viscosity of 4.53 mPa·s attributing to its low molecular weight of 4,000-6,000 g/mol. The water-soluble polymer II (PVS-Na) was readily sprayable, and only required highly reduced the amount of sprays on each side. Only 1 spray on each side was sufficient for the water-soluble polymer II (PVS-Na) to obtain a homogenous film coating. This reduction in spray volume led to higher dimensional accuracy retention after spraying compared to the water-soluble polymer I (PSS-Na).

Example 3

Drying Time Study and Solving Cracking Problem

The water-soluble coating material after being applied must be dried to remove solvent and form the water-soluble coating layer. Drying time directly influenced the polymer barrier efficiency and the coating quality. The drying process is dependent on time as a function of drying temperature, and this was explored by tracking the weight loss of the samples every 5 minute after being removed from a convection oven. The large size casting molds were coated with the water-soluble polymer II (PVS-Na) for the drying time study. It was observed that all the weight loss of the water-soluble polymer II (PVS-Na) approaches 30 wt. %, due to the fact that water content in the water-soluble polymer II (PVS-Na) is 70 wt. %.

Figure 8:
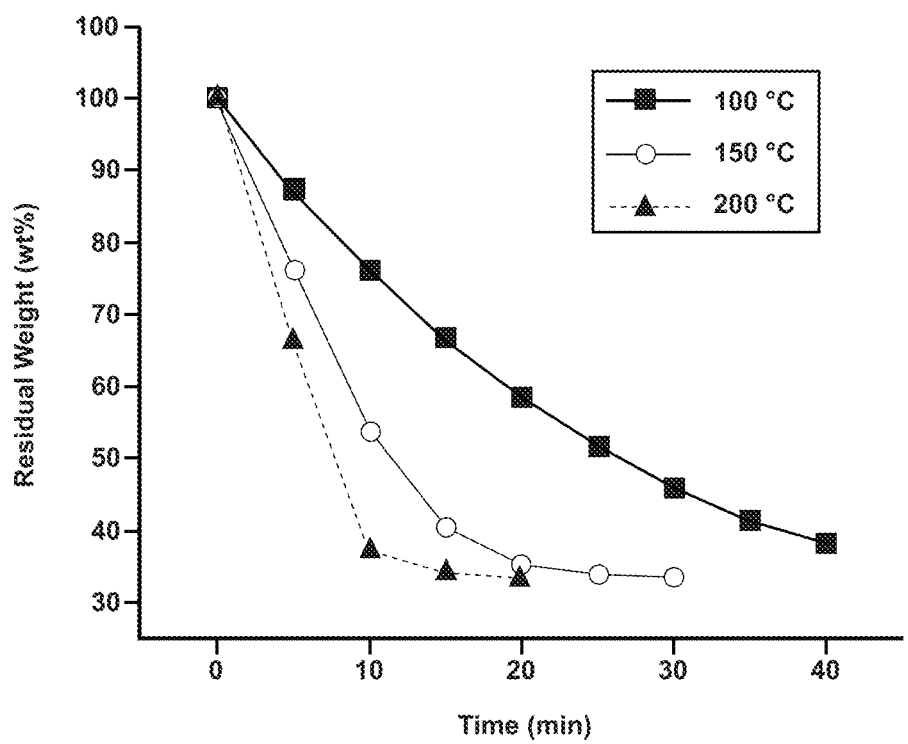
FIG. 8 illustrates a graph showing a non-limiting relationship between time of drying and residual weight of a water-soluble coating material.

FIG. 8 illustrates a graph showing a non-limiting relationship between time of drying and residual weight of a water-soluble coating material. The applied drying temperatures include 100° C., 150° C. and 200° C., which are above the boiling temperature of water. The time at which the residual weight reached around 30% and kept as a plateau was identified as fully dried. As the temperature was increased in the oven during curing, the weight loss occurs more rapidly. For example, drying at 200° C., the residual weight reaches the plateau of 30% in 10 minutes, drying at 150° C., the residual weight reaches the plateau of 30% in 20 minutes while with 100° C. drying temperature, the weight loss does not reach the plateau until 40 minutes.

Figure 9A:
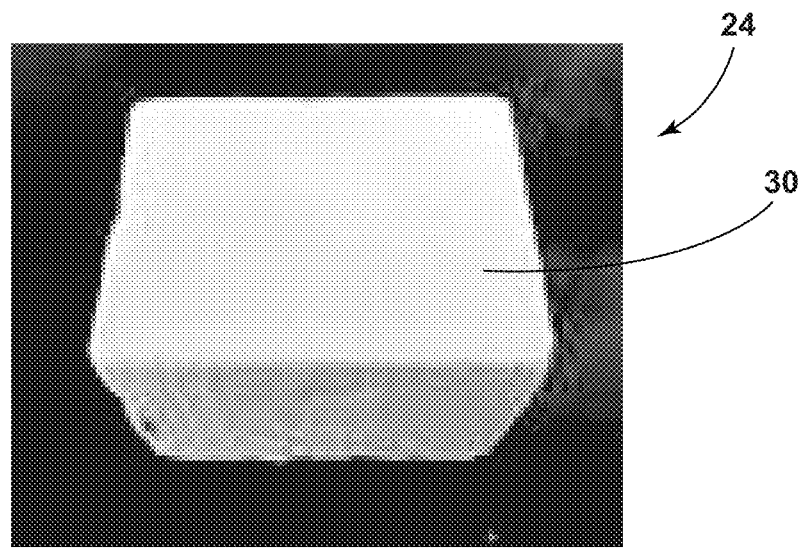
FIG. 9A illustrates a perspective view of a non-limiting embodiment of a casting mold including a water-soluble coating layer dried utilizing a drying method at a temperature.
Figure 9B:
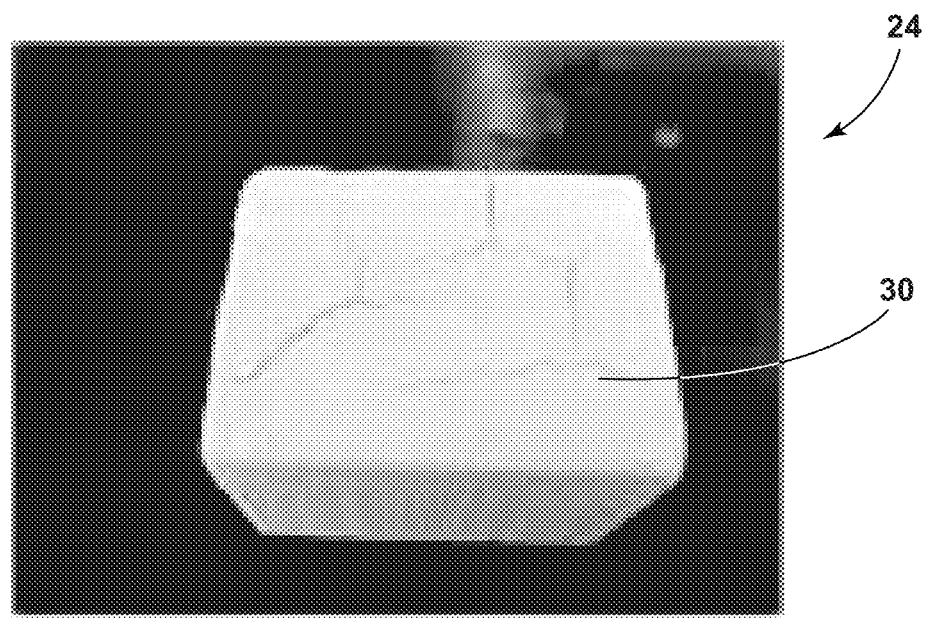
FIG. 9B illustrates a perspective view of a non-limiting embodiment of a casting mold including a water-soluble coating layer dried utilizing a drying method at another temperature.
Figure 9C:
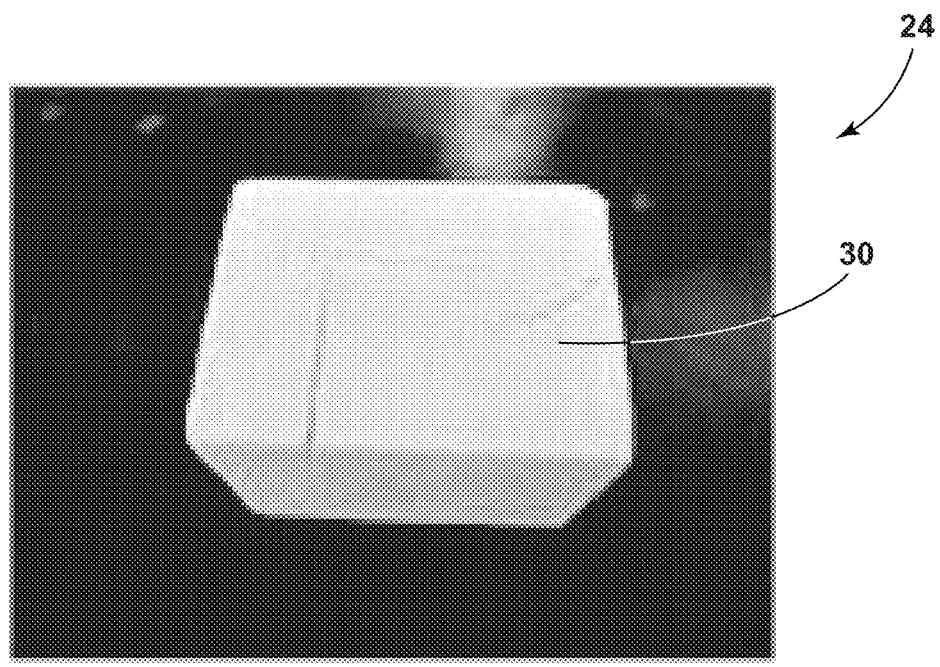
FIG. 9C illustrates a perspective view of a non-limiting embodiment of a casting mold including a water-soluble coating layer dried utilizing a method at yet another temperature.

FIG. 9A, FIG. 9B, and FIG. 9C illustrate perspective views of non-limiting embodiments of casting molds including the water-soluble polymer II (PVS-Na) dried utilizing a convection oven at 100° C., 150° C. and 200° C. The sample dried at 150° C. (FIG. 9B) exhibits the highest degree of cracking. The result suggests the occurrence of competition between the water penetration rate and bubble formation rate during drying. When the 150° C. dried sample is compared with 100° C. (FIG. 9A) and 200° C. (FIG. 9C) drying samples, the longer drying time than that of 200° C. resulted in more water penetration into the sample and faster evaporation rate than that of 100° C. leads to more generation of bubbles from the penetrated water.

Figure 10A:
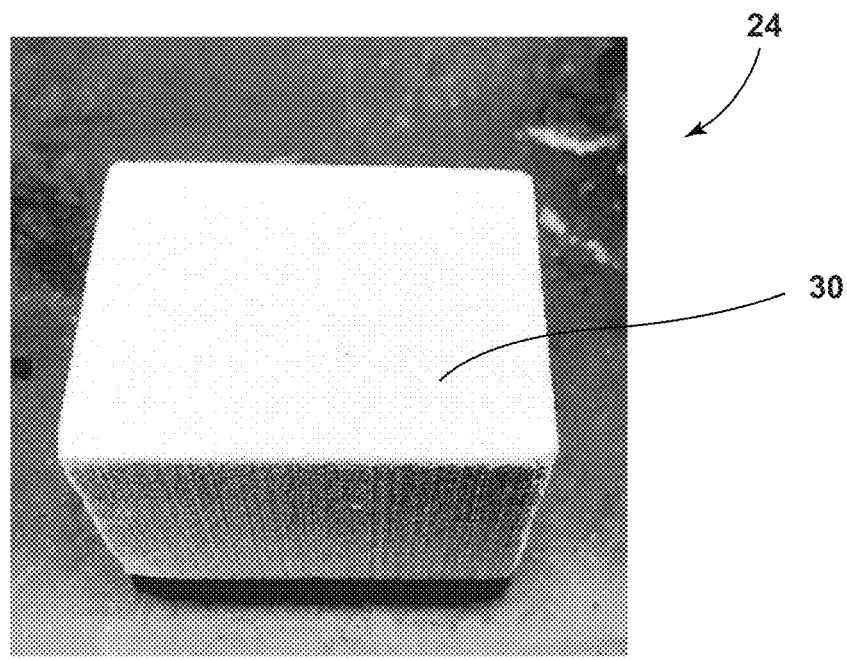
FIG. 10A illustrates a perspective view of a non-limiting embodiment of a casting mold including a water-soluble coating layer dried utilizing another drying method.
Figure 10B:
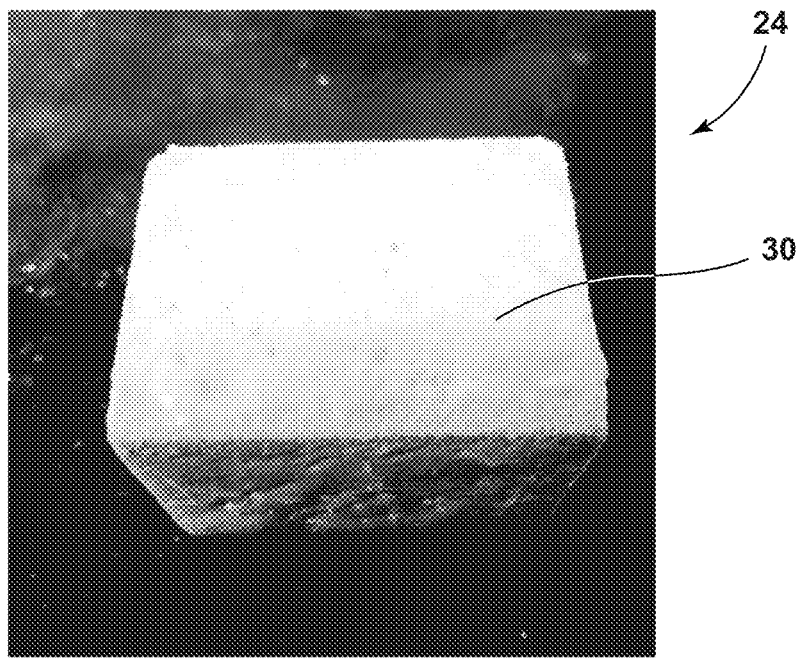
FIG. 10B illustrates a perspective view of a non-limiting embodiment of a casting mold including another water-soluble coating layer dried utilizing another drying method.

To minimize cracking, drying with a heat gun to quickly remove the solvent and increasing the water-soluble polymer concentration, were employed. FIG. 10A illustrates a perspective view a casting mold including a layer formed from the water-soluble polymer II (PVS-Na) at 30 wt. % dried utilizing a heat gun. FIG. 10B illustrates a perspective view a casting mold including a layer formed from the water-soluble polymer II (PVS-Na) at 50 wt. % dried utilizing a heat gun. Drying with heat gun resulted in a successful solvent removal without any cracks. Water-soluble polymer II (PVS-Na) at 50 wt. % showed a unfavorable viscosity of 61.67 mPa·s, but it was still sprayable and did not block the nozzle.

Example 4

Surface Finish Study

The surface roughness is quantified by the deviations in the direction of the normal vector of a real surface from its ideal form. In the conventional tooling industry, tools undergo multiple machining steps starting with rough cutting to remove bulk material, and eventually high-speed machining to achieve finer details. The grinding and polishing processes are performed as needed to achieve a particular surface quality. All these processes ensure a good surface finish with less roughness. The surface roughness of the sand tooling was studied utilizing a profilometer. Critical dimensions as step, curvature, and flatness were computed from the surface topography.

As shown in Table 1, the results showed that with the water-soluble polymer II (PVS-Na) at 30 wt. % coating, the surface roughness greatly decreased from 20.29 μm to 12.34 μm due to the homogenous coating on the cerabeads surface as compared to the non-coated surface and the water-soluble polymer I (PSS-Na) surface. The water-soluble polymer I (PSS-Na) surface achieved a higher roughness of 21.11 μm due to the partial dissolution of the parts induced by the high number of spray applications needed, which introduced a high volume of solvent for dissolution.

TABLE 1

Surface roughness study with profilometer

| Water-Soluble Coating Layer | Roughness (μm) |
| --- | --- |
| Non coated | 20.29 |
| PSS-Na, 2 wt. % coated | 21.11 |
| PVS-Na, 30 wt. % coated | 12.34 |

Example 5

Mechanical Properties Study

Figure 11:
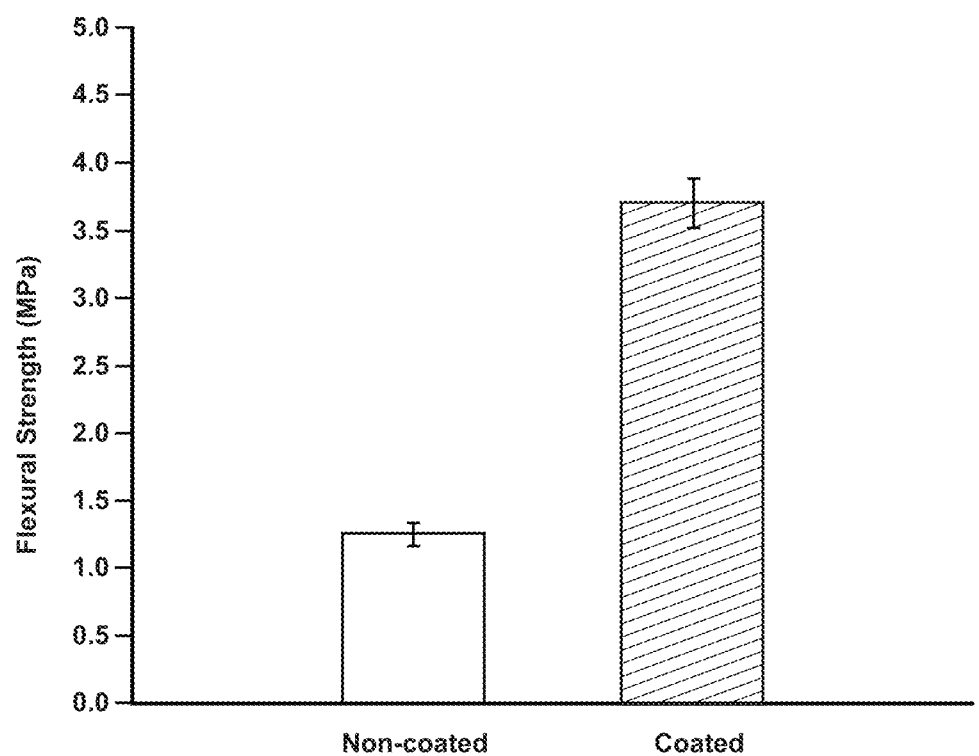
FIG. 11 illustrates a graph showing a non-limiting comparison of flexural strength of casting molds free of and including a water-soluble coating layer.
Figure 12A:
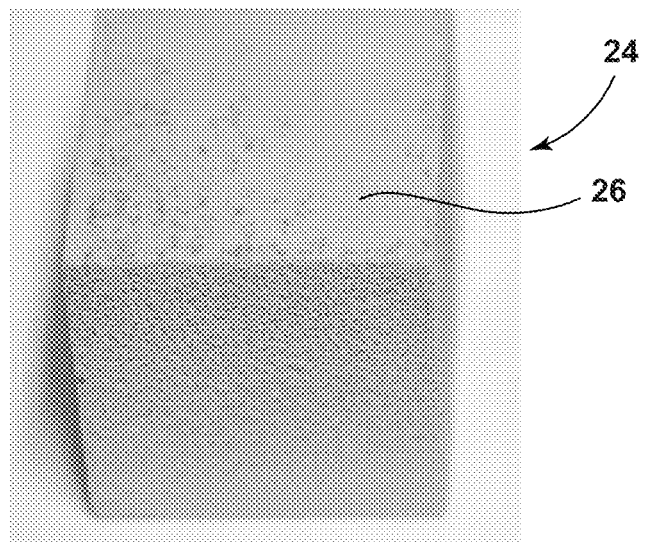
FIG. 12A illustrates a perspective view of a non-limiting embodiment of a casting mold free of a water-soluble coating layer after separation from a composite layup.
Figure 12B:
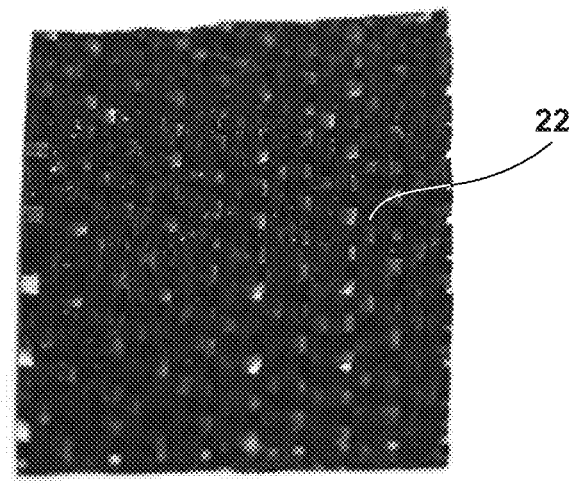
FIG. 12B illustrates a perspective view of a non-limiting embodiment of the composite layup of FIG. 12A after separation from the casting mold.
Figure 12C:
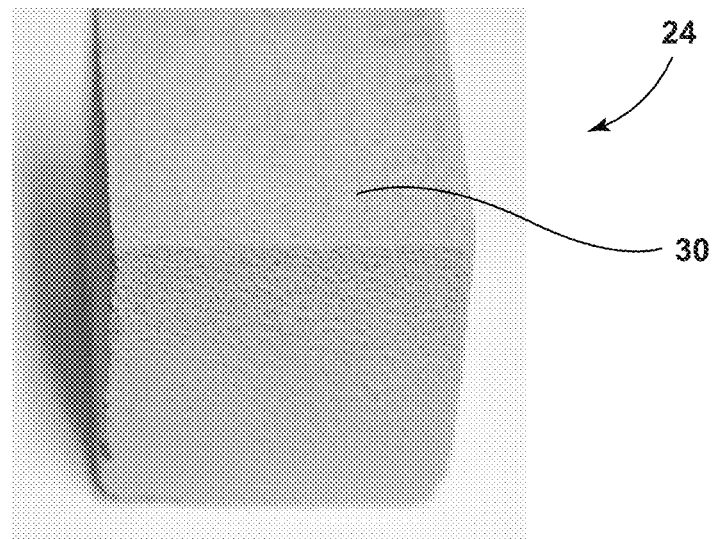
FIG. 12C illustrates a perspective view of a non-limiting embodiment of a casting mold including a water-soluble coating layer after separation from a composite layup.
Figure 12D:
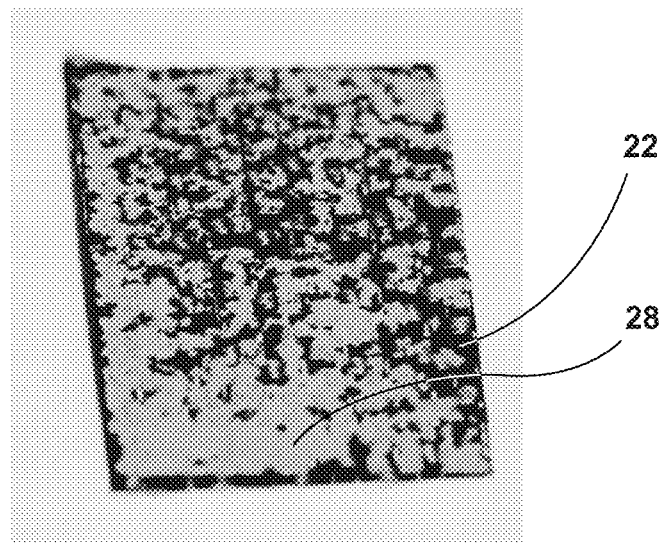
FIG. 12D illustrates a perspective view of a non-limiting embodiment of the composite layup of FIG. 12C after separation from the casting mold.
Figure 12E:
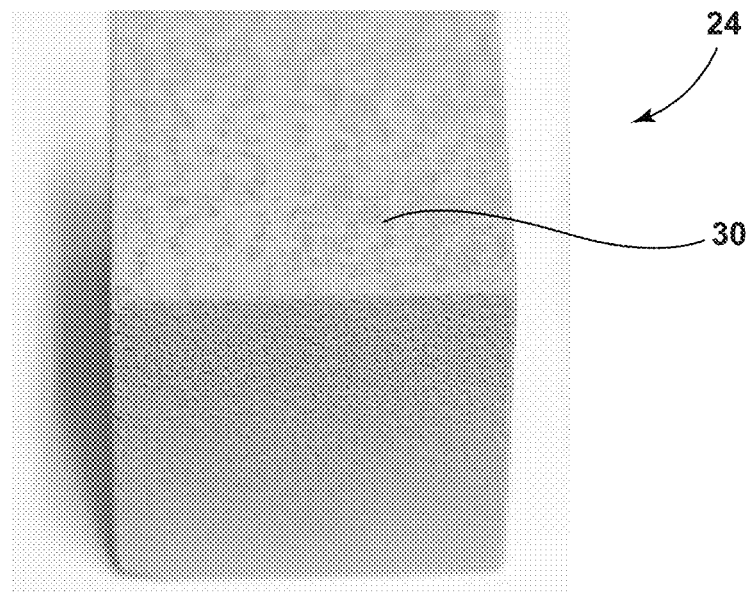
FIG. 12E illustrates a perspective view of a non-limiting embodiment of a casting mold including another water-soluble coating layer after separation from a composite layup.
Figure 12F:
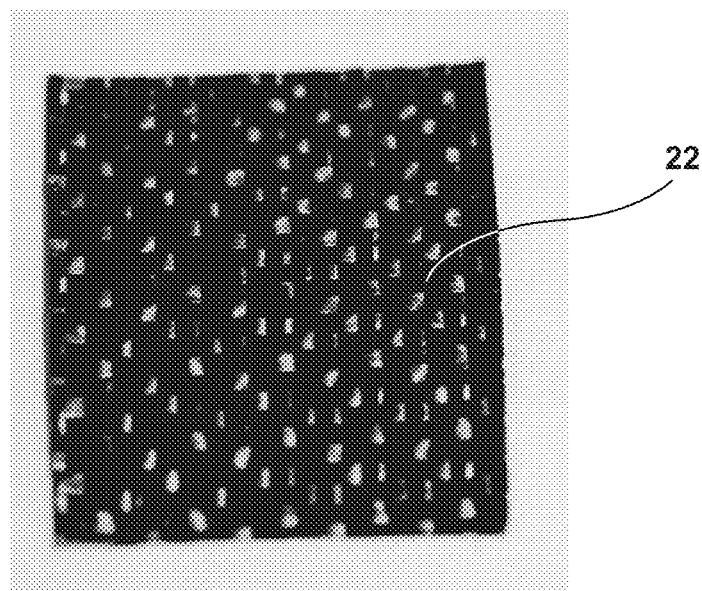
FIG. 12F illustrates a perspective view of a non-limiting embodiment of the composite layup of FIG. 12E after separation from the casting mold.

FIG. 11 illustrates a graph showing a comparison of flexural strength of casting molds free of and including the water-soluble polymer II (PVS-Na). The water-soluble polymer II (PVS-Na) coated cerabeads prints exhibited flexural strength of 3.6 MPa, three times that of the non-coated cerabead prints which was measured at 1.2 MPa. The average take-up ratio of the coating polymer on the printed parts was 19.0±1.20%. Since the printed parts was small (due to following 3-point bending measurement standard), the impact of the coating to the mechanical strength is probably larger than the case for a larger printed part.

Example 6

Composite Layup

The surface finish has a great impact on the efficacy of the composite layups and its use in aerospace and automotive applications. To understand how well the coating prevents resin migration from the layup to the casting mold, curable composite material I (HexPly® M18 carbon fiber prepreg) was applied to the surface of the large casting mold. The curable composite material I was then cured at 180° C. for 2 hours at 700 kN/m² (7 bar) pressure to mimic the application of pressure.

FIGS. 12A-12F illustrate perspective views of casting molds and composite layups. A casting mold free of the water-soluble polymer (FIG. 12A) resulted in a carbon fiber layup (FIG. 12B) exhibiting loose sand filling in the indentations of the casting mold. In contrast, a casting mold coated with the water-soluble polymer II (PVS-Na) (FIG. 12C) resulted in a carbon fiber layup (FIG. 12F) with no loose sand powder on the surface, indicating that less resin migrated from the layup into the porous tool surface. It should be noted that the brighter spot on carbon fiber of the water-soluble polymer II (PVS-Na) coated sand tools is a reflection of light instead of loose sand. Notable, a casting mold coated with the water-soluble polymer I (PSS-Na) (FIG. 12B) resulted in a carbon fiber layup (FIG. 12E) showed more sand cured into the surface of the epoxy within the composite layup the water-soluble polymer II (PVS-Na).

Example 7

Washout Test

Figure 13A:
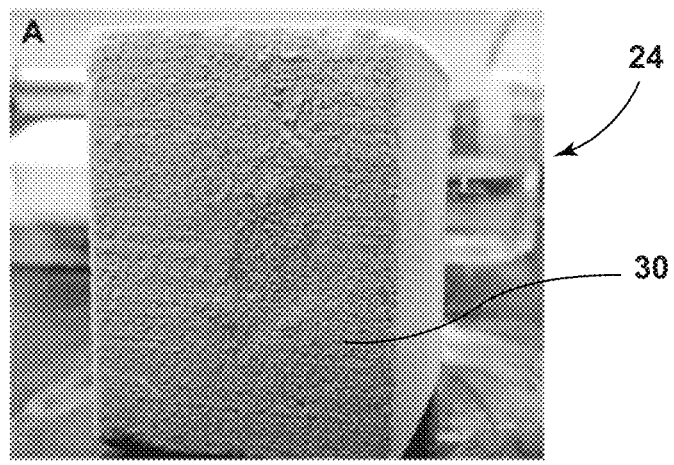
FIG. 13A illustrates a perspective view of a non-limiting embodiment of a casting mold including a water-soluble coating layer prior to exposure to an aqueous solution.
Figure 13B:
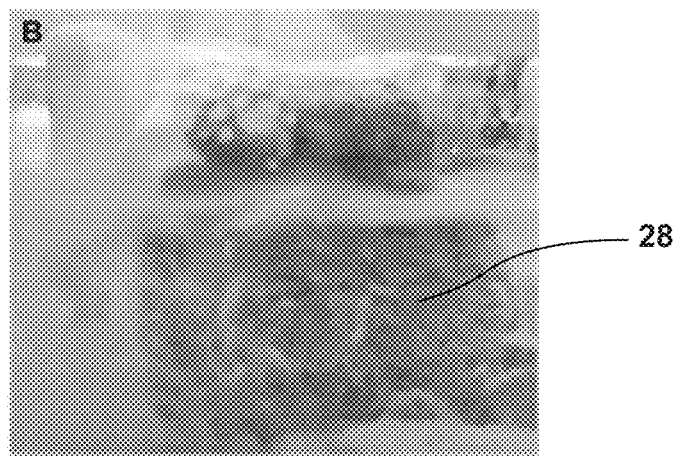
FIG. 13B illustrates a perspective view of a non-limiting embodiment of a casting mold including a water-soluble coating layer after 5 seconds of exposure to an aqueous solution.
Figure 13C:
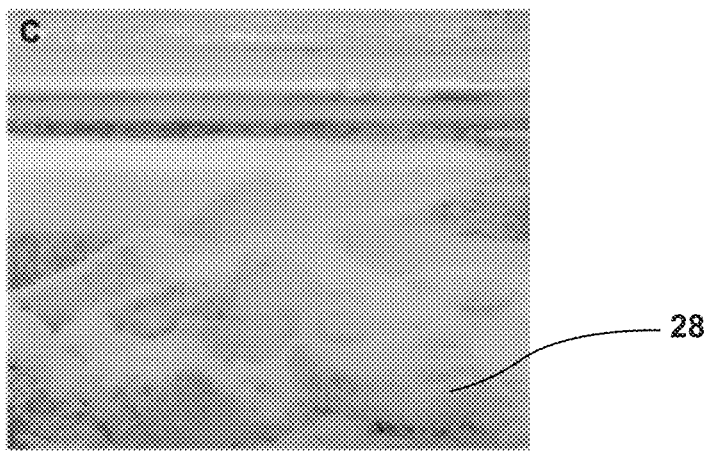
FIG. 13C illustrates a perspective view of a non-limiting embodiment of a casting mold including a water-soluble coating layer after 20 seconds of exposure to an aqueous solution.

The water-soluble coating layer formed from the water-soluble polymer II (PVS-Na) is soluble in water, but not soluble in other polar solvents due to the pendant sodium sulfonate group. FIG. 13A illustrates a perspective view of a casting mold including a water-soluble coating layer prior to exposure to an aqueous solution. FIG. 13B illustrates a perspective view of a casting mold including the water-soluble coating layer formed from the water-soluble polymer II (PVS-Na) after 5 seconds of exposure to an aqueous solution. FIG. 13C illustrates a perspective view of a casting mold including the water-soluble coating layer formed from the water-soluble polymer II (PVS-Na) after 20 seconds of exposure to an aqueous solution. The sand tool started to dissolve after 5 seconds when merged in tap water and totally dissolved after 20 seconds. The short dissolving time ensures a fast process in washout tooling.

Example 8

Dip-Coating

Casting molds including particulate material I (cerabeads) were printed with ExOne X1 binder jet 3D printer with the water-soluble binder II (PEI). The casting mold were formed to the dimensions of 31.7 mm long, 12.7 mm wide, and 6.35 mm tall with 15% solid loading of the water-soluble binder II (PEI). The casting molds were dip coated for 10 seconds in their respective water-soluble coating materials and then taken out with constant speed of 1 mm/s.

Figure 14A:
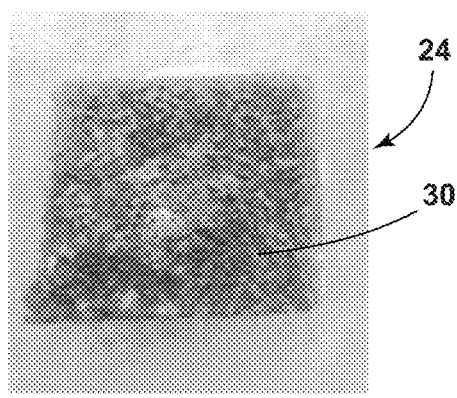
FIG. 14A illustrates a perspective view of a non-limiting embodiment of a casting mold including a water-soluble coating layer.

FIG. 14A illustrates a perspective view of a casting mold including a water-soluble coating layer formed from a water-soluble coating material including water-soluble polymer III (1-PAA), solvent II (MeOH), and neutralizing component I (NaOH). This casting mold was coated following a consecutive dip-coating process including a first submersion in the water-soluble polymer III (1-PAA) followed by a second submersion in neutralizing component I (NaOH) and solvent II (MeOH 0.9% w/w), to form a poly(acrylic acid, sodium salt).

Figure 14B:
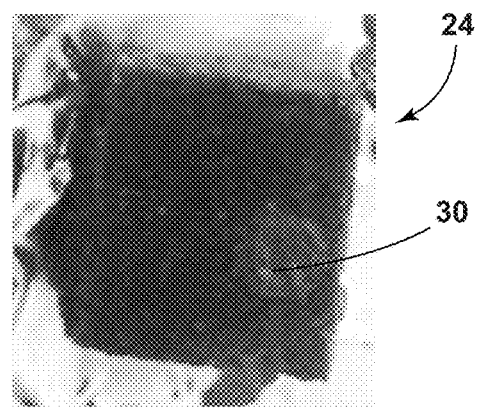
FIG. 14B illustrates a perspective view of a non-limiting embodiment of a casting mold including another water-soluble coating layer.

FIG. 14B illustrates a perspective view of a casting mold including a water-soluble coating layer formed from a water-soluble coating material including water-soluble polymer III (1-PAA) and filler component I (1% nanofiller). This casting mold was coated following a single dip-coating process including submersion in the water-soluble coating material.

Figure 14C:
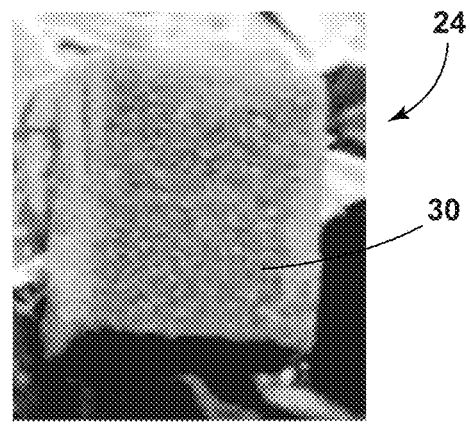
FIG. 14C illustrates a perspective view of a non-limiting embodiment of a casting mold including yet another water-soluble coating layer.

FIG. 14C illustrates a perspective view of a casting mold including a water-soluble coating layer formed from a water-soluble coating material including water-soluble polymer III (1-PAA) and solvent II (MeOH 10% w/w). This casting mold was coated following a single dip-coating process including submersion in the water-soluble coating material.

Figure 14D:
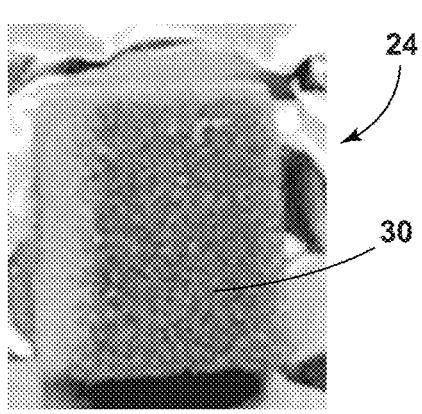
FIG. 14D illustrates a perspective view of a non-limiting embodiment of a casting mold including still another water-soluble coating layer.

FIG. 14D illustrates a perspective view of a casting mold including a water-soluble coating layer formed from a water-soluble coating material including water-soluble polymer III (1-PAA) and solvent III (1-propanol 10% w/w). This casting mold was coated following a single dip-coating process including submersion in the water-soluble coating material.

Figure 14E:
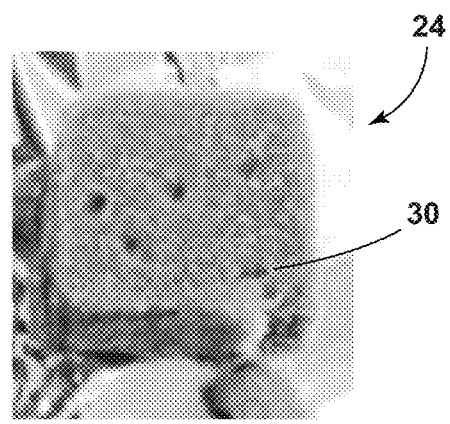
FIG. 14E illustrates a perspective view of a non-limiting embodiment of a casting mold including yet another water-soluble coating layer.

FIG. 14E illustrates a perspective view of a casting mold including a water-soluble coating layer formed from a water-soluble coating material including water-soluble polymer III (1-PAA) and solvent I (water 10% w/w). This casting mold was coated following a single dip-coating process including submersion in the water-soluble coating material.

The advantages of the consecutive dip-coating include 1) easy operation of creating a homogenous film, and 2) high Tg film formation. The coated samples of FIG. 14A-14E all exhibit a decrease in loose particulate material I (cerabeads) remaining on the exterior surface of the casting mold by simply scratching the surface. After dip-coating, it is observed that a film forms on the surface, but the polymer solution also functions as a binder, binding the loose sand on the surface of the casting mold. A homogenous film can be observed on the surface of the PAA+NaOH consecutive dip-coated sample (FIG. 14A). When utilizing water as the solvent for dip coating, due to the good solubility of the water-soluble binder II (PEI) in solvent I (water), the castings molds coated with PAA in water solution do not maintain good dimensional accuracy, as the binder partially dissolved in water before the PAA film coated on the exterior surface. All samples survived in the oven at 180° C. for 2 hours.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A washout tooling for a composite layup, comprising:
   a mold having an exterior surface, the mold comprising a particulate material and a water-soluble binder, the mold adapted to break down in the presence of an aqueous solution;
   a water-soluble coating layer overlying the exterior surface of the mold, the water-soluble coating layer being adapted to break down in the presence of an aqueous solution; and
   a curable composite layer overlying the water-soluble coating layer opposite of the mold, the curable composite layer including a plurality of fibers and a curable resin;
   wherein the water-soluble coating layer minimizes contact between the particulate material and the curable resin of the curable composite layer,
   wherein the water-soluble coating layer comprises a water-soluble coating material having a glass transition temperature of from about 50° C. to about 500° C. according to ASTM D7028-07(2015), and
   wherein the water-soluble coating material comprises a neutralizing component, the neutralizing component comprising sodium hydroxide, potassium hydroxide, poly(vinyl pyrrolidone), or combinations thereof.

2. The washout tooling of claim 1, wherein the water-soluble coating layer has a water solubility of from about 10 g to about 70 g in 100 g water at 23° C. according to OECD 105.

3. The washout tooling of claim 1, wherein the water-soluble coating material comprises a water-soluble polymer, the water-soluble polymer comprising poly(vinyl alcohol), poly(acrylic acid), poly(acrylic acid, sodium salt), poly (sodium 4-styrenesulfonate), poly(vinylsulfonic acid, sodium salt), or combinations thereof.

4. The washout tooling of claim 1, wherein the water-soluble coating material comprises a solvent, the solvent comprising methanol, 1-propanol, ethanol, isopropanol, water, or combinations thereof.

5. A washout tooling for a composite layup, comprising:
   a mold having an exterior surface, the mold comprising a particulate material and a water-soluble binder, the mold adapted to break down in the presence of an aqueous solution;
   a water-soluble coating layer overlying the exterior surface of the mold, the water-soluble coating layer being adapted to break down in the presence of an aqueous solution; and
   a curable composite layer overlying the water-soluble coating layer opposite of the mold, the curable composite layer including a plurality of fibers and a curable resin;
   wherein the water-soluble coating layer minimizes contact between the particulate material and the curable resin of the curable composite layer,
   wherein the water-soluble coating layer comprises a water-soluble coating material having a glass transition temperature of from about 50° C. to about 500° C. according to ASTM D7028-07(2015), and
   wherein the water-soluble coating material comprises a filler, the filler comprising a nanofiller, salts, or combinations thereof.

6. The washout tooling of claim 1, wherein the aqueous solution includes an alcohol, ketones, acetates, cyclic ethers, or combinations thereof.

7. The washout tooling of claim 1, wherein the particulate material comprises a sand, a gypsum, a metal, or a ceramic powder.

8. The washout tooling of claim 1, wherein the water-soluble binder comprises a poly(ethyleneimine), poly(vinyl pyrrolidone), poly(vinyl alcohol), poly(acrylic acid), poly (vinylsulfonic acid, sodium salt), copolymers thereof, or combinations thereof.

9. The washout tooling of claim 1, wherein the plurality of fibers comprise carbon fibers.

10. The washout tooling of claim 1, wherein break down of the mold is in the presence of the aqueous solution at a temperature of from about 23° C. to about 100° C. and at a pressure of at least 40 psi.

11. The washout tooling of claim 1, wherein break down of the water-soluble coating layer is in the presence of the aqueous solution at a temperature of from about 23° C. to about 100° C. and at a pressure of at least 40 psi.

12. A method for forming a composite layup, the method comprising:
   combining a particulate material and a water-soluble binder to form a mold having an exterior surface;
   applying a water-soluble coating material to the exterior surface of the mold to form a water-soluble coating layer;
   applying a curable composite material to the water-soluble coating layer opposite of the mold to form a curable composite layer, the curable composite layer including a plurality of fibers and a curable resin;

curing the curable resin to form a hardened composite layup; and exposing the mold and the water-soluble coating layer to an aqueous solution to wash the hardened composite layup free of the mold and the water-soluble coating;

wherein the water-soluble coating layer minimizes contact between the particulate material and the curable resin of the curable composite layer wherein applying the water-soluble coating material comprises submerging the mold in the aqueous solution, and wherein the water-soluble coating material comprises poly(acrylic acid).

13. The method of claim 12, wherein submerging the casting mold in the water-soluble coating material comprises:

submerging the mold in the water-soluble coating material;

removing the mold from the water-soluble coating material; and submerging the mold in the water-soluble coating material.

14. A method for forming a composite layup, the method comprising:

combining a particulate material and a water-soluble binder to form a mold having an exterior surface;

applying a water-soluble coating material to the exterior surface of the mold to form a water-soluble coating layer;

applying a curable composite material to the water-soluble coating layer opposite of the mold to form a curable composite layer, the curable composite layer including a plurality of fibers and a curable resin;

curing the curable resin to form a hardened composite layup; and exposing the mold and the water-soluble coating layer to an aqueous solution to wash the hardened composite layup free of the mold and the water-soluble coating;

wherein the water-soluble coating layer minimizes contact between the particulate material and the curable resin of the curable composite layer, wherein applying the water-soluble coating material comprises spraying the mold with the water-soluble coating material, and wherein the water-soluble coating material comprises poly(vinylsulfonic acid, sodium salt).

15. The method of claim 12, wherein combining the particulate material and the water-soluble binder comprises jetting the water-soluble binder on the particulate material to form the mold.

16. A washout tooling for a composite layup, comprising:

a casting mold having an exterior surface, the casting mold comprising a particulate material and a water-soluble binder, the casting mold adapted to break down in the presence of an aqueous solution;

a water-soluble coating layer overlying the exterior surface, the water-soluble coating layer adapted to break down in the presence of an aqueous solution; and a curable composite layer overlying the water-soluble coating layer;

wherein the water-soluble coating layer minimizes contact between the particulate material and the curable composite layer, and wherein the water-soluble coating layer comprises a neutralizing component, the neutralizing component comprising sodium hydroxide, potassium hydroxide, poly(vinyl pyrrolidone), or combinations thereof.

17. A washout tooling for a composite layup, comprising:

a casting mold having an exterior surface, the casting mold comprising a particulate material and a water-soluble binder, the casting mold adapted to break down in the presence of an aqueous solution;

a water-soluble coating layer overlying the exterior surface, the water-soluble coating layer adapted to break down in the presence of an aqueous solution; and a curable composite layer overlying the water-soluble coating layer;

wherein the water-soluble coating layer minimizes contact between the particulate material and the curable composite layer, and wherein the water-soluble coating layer comprises a filler, the filler comprising a nanofiller, salts, or combinations thereof.

18. A method for forming a composite layup, the method comprising:

combining a particulate material and a water-soluble binder to form a casting mold having an exterior surface;

applying a water-soluble coating material to overly the exterior surface to form a water-soluble coating layer;

applying a curable composite material to the water-soluble coating layer to form a curable composite layer; and exposing the casting mold and the water-soluble coating layer to an aqueous solution to form the composite layup;

wherein the water-soluble coating layer minimizes contact between the particulate material and the curable composite layer, and wherein the water-soluble coating material comprises poly(acrylic acid).

19. A method for forming a composite layup, the method comprising:

combining a particulate material and a water-soluble binder to form a casting mold having an exterior surface;

applying a water-soluble coating material to overlay the exterior surface to form a water-soluble coating layer;

applying a curable composite material to the water-soluble coating layer to form a curable composite layer; and exposing the casting mold and the water-soluble coating layer to an aqueous solution to form the composite layup;

wherein the water-soluble coating layer minimizes contact between the particulate material and the curable composite layer, and wherein the water-soluble coating material comprises poly(vinylsulfonic acid, sodium salt).

* * * * *